(12) United States Patent
Sawhney et al.

(10) Patent No.: US 11,574,460 B2
(45) Date of Patent: Feb. 7, 2023

(54) SAMPLE CONTAINER RECOGNITION

(71) Applicant: BECKMAN COULTER, INC., Brea, CA (US)

(72) Inventors: Amit Sawhney, Minneapolis, MN (US); Niandong Liu, Eagan, MN (US); Nobuyuki Hakiri, Shizuoka Ken (JP)

(73) Assignee: BECKMAN COULTER, INC., Brea, CA (US)

( * ) Notice: Subject to any disclaimer, the term of this patent is extended or adjusted under 35 U.S.C. 154(b) by 338 days.

(21) Appl. No.: 16/757,924

(22) PCT Filed: Oct. 26, 2018

(86) PCT No.: PCT/US2018/057810
§ 371 (c)(1),
(2) Date: Apr. 21, 2020

(87) PCT Pub. No.: WO2019/084468
PCT Pub. Date: May 2, 2019

(65) Prior Publication Data
US 2020/0372287 A1    Nov. 26, 2020

Related U.S. Application Data

(60) Provisional application No. 62/578,236, filed on Oct. 27, 2017.

(51) Int. Cl.
*G06V 10/75* (2022.01)
*G06T 7/62* (2017.01)
(Continued)

(52) U.S. Cl.
CPC ..... *G06V 10/751* (2022.01); *G01N 35/00732* (2013.01); *G01N 35/04* (2013.01); *G06K 7/1413* (2013.01); *G06T 7/62* (2017.01); *G06V 10/255* (2022.01); *G06V 10/44* (2022.01); *G06V 10/507* (2022.01); *G01N 2035/00752* (2013.01); *G01N 2035/0403* (2013.01);
(Continued)

(58) Field of Classification Search
CPC ......... G06V 10/751; G06V 10/44; G06T 7/62
USPC ........................................................ 382/103
See application file for complete search history.

(56) References Cited

U.S. PATENT DOCUMENTS

8,974,733 B2 * 3/2015 Haga .................... G01N 35/028
422/65
10,269,813 B2 * 4/2019 Okita ................ H01L 27/11507
(Continued)

FOREIGN PATENT DOCUMENTS

WO    2015191702 A1    12/2015

OTHER PUBLICATIONS

International Preliminary Report on Patentability for PCT Patent Application No. PCT/US2018/057810, dated May 7, 2020, 10 pages.
(Continued)

Primary Examiner — Allyson N Trail
(74) Attorney, Agent, or Firm — McAndrews Held & Malloy, Ltd.

(57) ABSTRACT

Systems and methods are provided for recognizing various sample containers carried in a rack. The systems and methods are performed to identify sample containers in the rack and detect various characteristics associated with the containers and/or the rack, which are evaluated to determine the validity and/or types of the containers in the rack.

15 Claims, 28 Drawing Sheets

(51) Int. Cl.
    *G01N 35/00*    (2006.01)
    *G01N 35/04*    (2006.01)
    *G06K 7/14*     (2006.01)
    *G06V 10/44*    (2022.01)
    *G06V 10/20*    (2022.01)
    *G06V 10/50*    (2022.01)

(52) U.S. Cl.
    CPC ........... *G01N 2035/0412* (2013.01); *G01N 2035/0493* (2013.01); *G06T 2207/10144* (2013.01)

(56) References Cited

U.S. PATENT DOCUMENTS

| | | | |
|---|---|---|---|
| 2007/0134131 | A1 | 6/2007 | Watson |
| 2009/0324032 | A1 | 12/2009 | Chen |
| 2012/0140230 | A1* | 6/2012 | Miller ............... G06T 7/0012 356/432 |
| 2019/0383793 | A1* | 12/2019 | Sugiyama ......... G01N 35/0099 |
| 2020/0211697 | A1* | 7/2020 | Adiri ............... G01N 33/5094 |
| 2020/0372287 | A1* | 11/2020 | Sawhney ............... G06T 7/62 |

OTHER PUBLICATIONS

International Search Report and Written Opinion for PCT Patent Application No. PCT/US2018/057810 dated Feb. 28, 2019. 12 Pages.

* cited by examiner

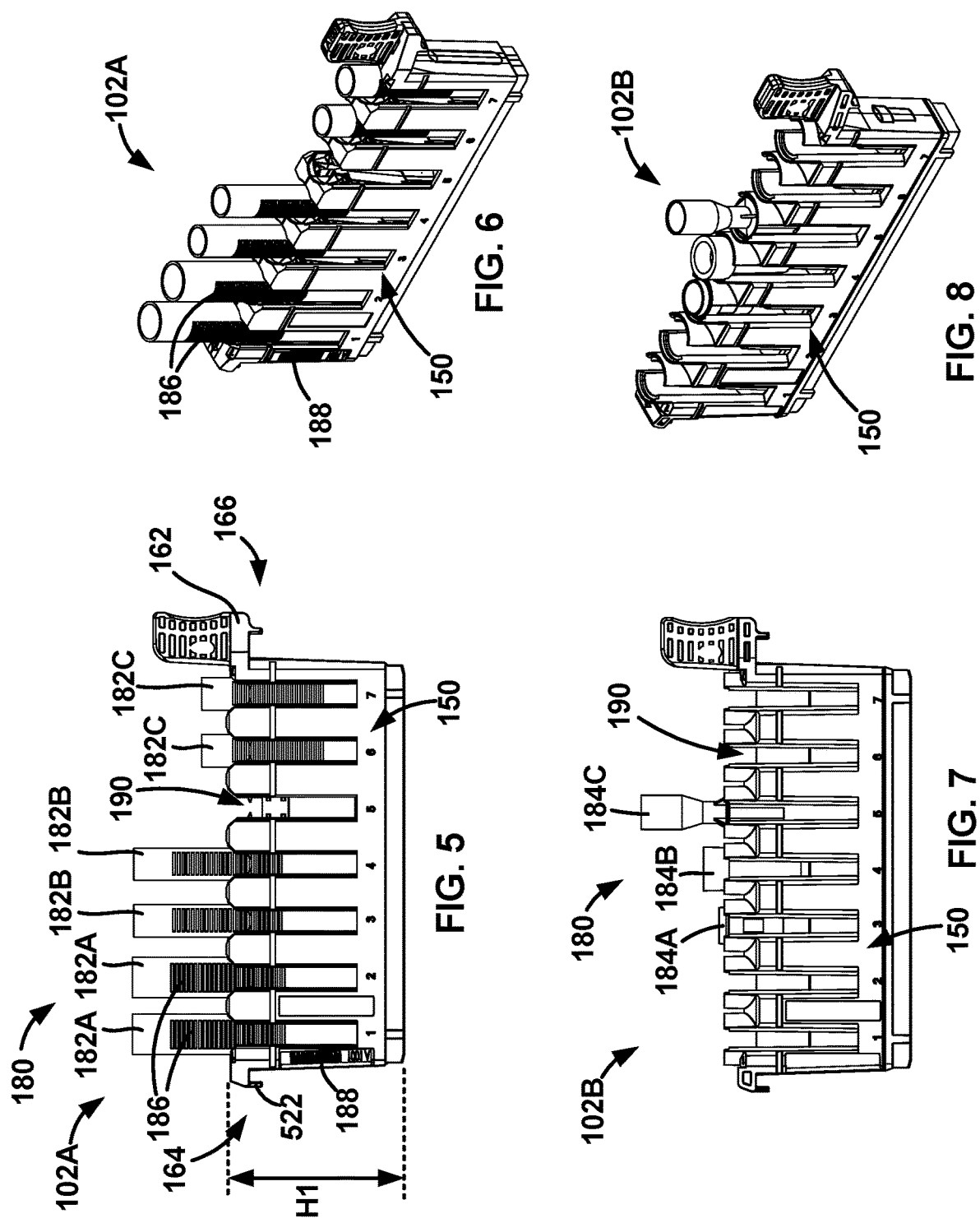

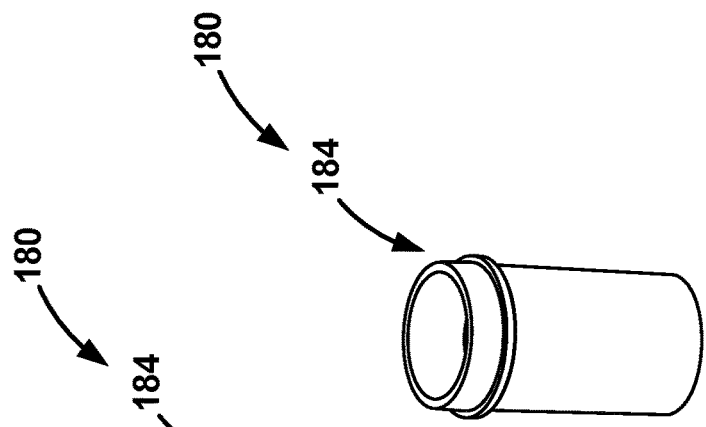
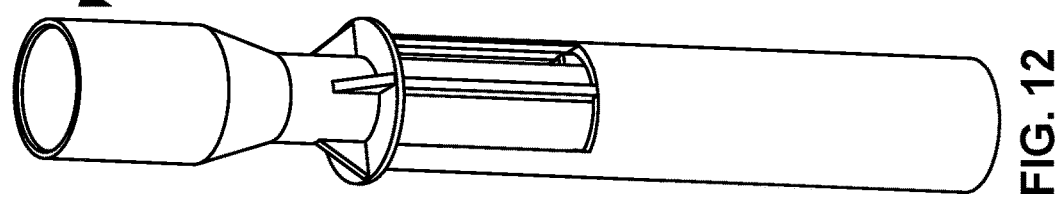
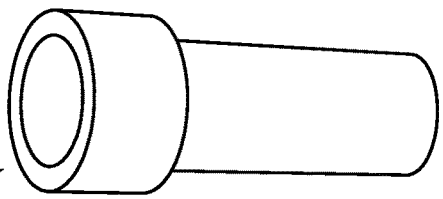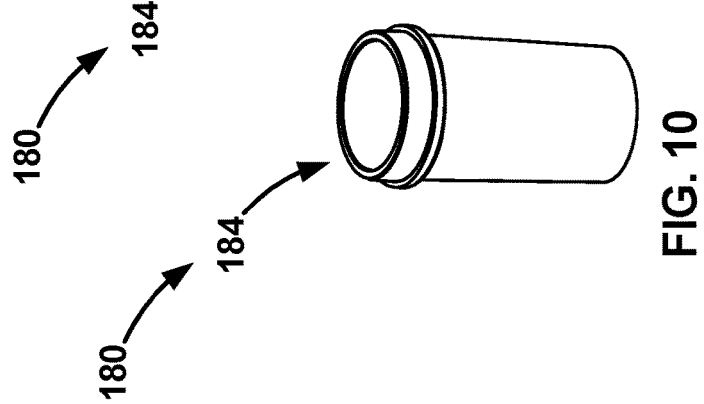

| Classification | Rack ID | Height | | | Width | | | Hist | | |
|---|---|---|---|---|---|---|---|---|---|---|
| | | Ave (px) | Min (px) | Max (px) | Ave (px) | Min (px) | Max (px) | Ave (value) | Min (value) | Max (value) |
| 12x65 or 13x75 mm tube | Tube (A.xxx) | H1 | H2 | H3 | W1 | W2 | W3 | HS1 | HS2 | HS3 |
| 12x65 or 13x75 mm tube + cap | Tube (A.xxx) | H4 | H5 | H6 | W4 | W5 | W6 | HS4 | HS5 | HS6 |
| 13x100 mm tube | Tube (A.xxx) | ... | ... | ... | ... | ... | ... | ... | ... | ... |
| 13x100 mm tube + 1 ml insert cup (pediatric cup, 81316) | Tube (A.xxx) | ... | ... | ... | ... | ... | ... | ... | ... | ... |
| 12x65 or 13x75 mm tube + 1 ml insert cup (pediatric cup, 81916) | Tube (A.xxx) | ... | ... | ... | ... | ... | ... | ... | ... | ... |
| 1 ml insert (pediatric cup, 81316) into PED adapter (12700213020) | Tube (A.xxx) | ... | ... | ... | ... | ... | ... | ... | ... | ... |
| 13x100 mm tube + 1 ml insert cup (81915) | Tube (A.xxx) | ... | ... | ... | ... | ... | ... | ... | ... | ... |
| 13x100 mm tube | Tube (A.xxx) | ... | ... | ... | ... | ... | ... | ... | ... | ... |
| 16x100 mm tube | Tube (A.xxx) | ... | ... | ... | ... | ... | ... | ... | ... | ... |
| 16x100 mm tube + Beckman 0.5 ml cup | Tube (A.xxx) | ... | ... | ... | ... | ... | ... | ... | ... | ... |
| 16x100 mm tube + Beckman 2 ml cup | Tube (A.xxx) | ... | ... | ... | ... | ... | ... | ... | ... | ... |
| 16x100 mm tube + Beckman 2 ml cup insert | Tube (A.xxx) | ... | ... | ... | ... | ... | ... | ... | ... | ... |
| 16x100 mm tube + Hitachi 2 ml cup | Tube (A.xxx) | ... | ... | ... | ... | ... | ... | ... | ... | ... |
| 16x100 mm tube + cap | Tube (A.xxx) | ... | ... | ... | ... | ... | ... | ... | ... | ... |
| Beckman 0.5 ml cup | Cup (B.xxx) | ... | ... | ... | ... | ... | ... | ... | ... | ... |
| Beckman 2 ml cup | Cup (B.xxx) | ... | ... | ... | ... | ... | ... | ... | ... | ... |
| Beckman 3 ml cup | Cup (B.xxx) | ... | ... | ... | ... | ... | ... | ... | ... | ... |
| Hitachi 2 ml cup | Cup (B.xxx) | ... | ... | ... | ... | ... | ... | ... | ... | ... |

FIG. 31

SAMPLE CONTAINER RECOGNITION

The present application is filed pursuant to 35 U.S.C. 371 as a U.S. National Phase application of International Patent application No. PCT/US2018/057810, which was filed Oct. 26, 2018 and claims priority to U.S. Provisional patent application Ser. No. 62/578,236, filed Oct. 27, 2017 The entire texts of the aforementioned applications are incorporated by reference in their entirety.

BACKGROUND

A sample analyzer typically uses a sample presentation unit (SPU) for supporting and transferring a sample rack which holds a plurality of sample containers, such as sample tubes or cups. Typical SPUs allow only a single type of container to be held in a single sample rack. Problems can occur when another type of sample container is accidentally loaded into the rack by a user, or when containers in the rack are obstructed or not loaded into the proper position in the rack.

SUMMARY

In general terms, this disclosure is directed to sample container recognition. In some embodiments, and by non-limiting example, a sample presentation unit in a sample analyzer is configured to recognize sample container types in a rack.

In one aspect, an automated clinical analyzer includes: a sample rack presentation unit configured to present a sample rack to a sample pipettor, the sample rack having a plurality of sample container positions; an image capturing device coupled to the sample rack presentation unit, the image capturing device configured to capture at least one image on at least one region of interest on the sample rack, the at least one region of interest comprises at least one sample container; a computing device configured to identify a sample container type in a captured image by matching the captured image to reference images, the reference images comprising images of a plurality of different sample container types; and the computing device further configured to identify the sample container type in the captured image based on a matching threshold with the reference images, wherein if the captured image exceeds or is equal to the threshold of a reference image, then the sample container type is identified as the sample container type of the reference image, and wherein if the captured image does not meet the threshold of any reference image, then the sample container type is not identified.

In another aspect, a method of determining a type of a container in a rack includes: capturing, using an image capturing device, at least one image of at least a portion of the container and at least a portion of the rack, the container being held by the rack; finding a reference feature on the rack as a first image feature in the at least one image; defining, at least in part, a first search area in the at least one image based on a first relative position to the first image feature in the at least one image; finding within the first search area in the at least one image a first feature on the container as a second image feature in the at least one image; calculating a first geometric characteristic of the container based on a location of the second image feature in the at least one image; and determining the type of the container by looking up the first geometric characteristic of the container in a table.

In yet another aspect, a method of determining a type and an identity of a container in a rack includes: capturing, using an image capturing device, at least one high exposure image of at least a portion of the container and at least a portion of the rack, the container being held by the rack; reading a code mark from the at least one high exposure image and thereby determining the identity of the container in the rack; capturing, using the image capturing device, at least one low exposure image of at least a portion of the container and at least a portion of the rack; finding a reference feature on the rack as an image feature in the at least one low exposure image and/or in the at least one high exposure image; defining, at least in part, a search area in the at least one low exposure image based on a relative position to the first image feature; finding within the first search area in the at least one low exposure image a feature on the container as a second image feature; calculating a geometric characteristic of the container based on a location of the second image feature; and determining the type of the container by looking up the geometric characteristic of the container in a table.

In yet another aspect, a method of determining if a cap is on a container in a rack includes: capturing, using an image capturing device, at least one image of at least a portion of the container and at least a portion of the rack, the container being held by the rack; finding a reference feature on the rack as a first image feature in the at least one image; defining, at least in part, a search area in the at least one image based on a first relative position to the first image feature in the at least one image; finding within the search area in the at least one image a feature on the container as a second image feature in the at least one image; defining a histogram area based on a second relative position of the second image feature in the at least one image; and extracting histogram information from the histogram area and thereby determining if the cap is on the container.

BRIEF DESCRIPTION OF THE DRAWINGS

FIG. 5 is an elevation view of an example tube rack.

FIG. 6 is a perspective view of the tube rack of FIG. 5.

FIG. 7 is an elevation view of an example cup rack.

FIG. 8 is a perspective view of the cup rack of FIG. 7.

FIG. 10 is a perspective view illustrating an example type of a sample cup.

FIG. 11 is a perspective view illustrating another example type of a sample cup.

FIG. 12 is a perspective view illustrating still another example type of a sample cup.

FIG. 13 is a perspective view illustrating yet another example type of a sample cup.

FIG. 31 is an example classification table.

DETAILED DESCRIPTION

Figure 1:
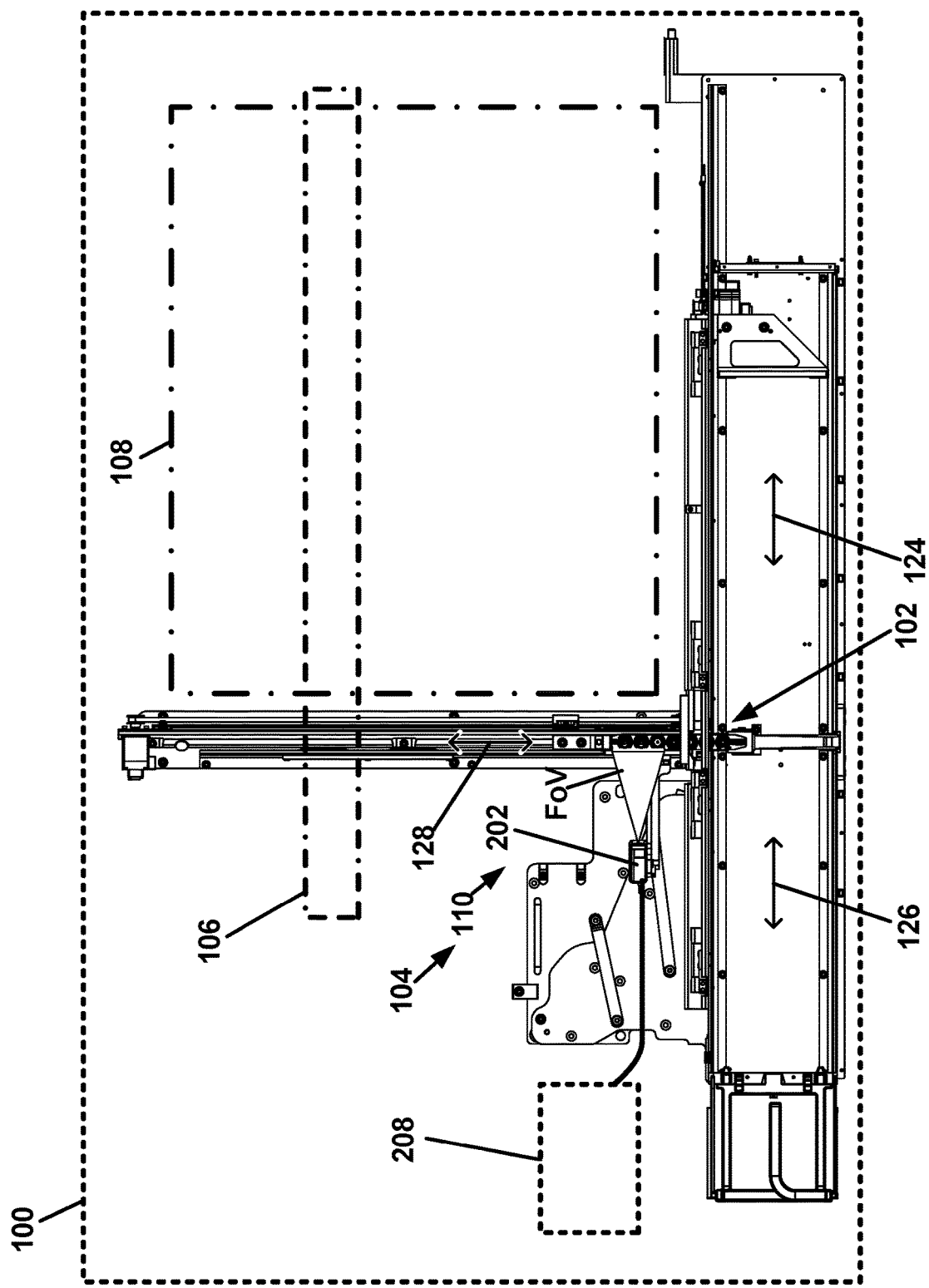
FIG. 1 is a top plan view of an example sample analyzer.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a top plan view of an example sample analyzer. In this example, the sample analyzer is generally designated as reference number 100 and configured to analyze a sample. The sample analyzer 100 includes a sample rack 102, a sample presentation unit (SPU) 104, a sample pipettor transfer unit 106, an analytic unit 108, and a sample container recognition unit 110.

The rack 102 is configured to hold and transfer one or more sample containers 180. For example, the rack 102 can be used in various applications and configured to transfer one or more containers 180 within or outside the sample analyzer 100. As illustrated in FIGS. 5-8, one or more sample containers 180 can be positioned in the rack 102 in various combinations. As described herein, one or more sample containers 180 can be individually inserted and engaged with the rack 102. Although a single rack 102 is illustrated in this example, it is understood that the sample analyzer 100 is configured to support a plurality of racks 102, which can be used in various combinations in the sample analyzer 100 and operated either individually or in any combination.

The SPU 104 operates to support the rack 102 and transfer the rack 102 to various locations. An example operation of the rack 102 is further described and illustrated with reference to FIGS. 2-9.

The sample pipettor transfer unit 106 operates to draw samples from the containers in the racks 102 and transfer the samples to the analytic unit for analysis. The sample pipettor transfer unit 106 contains a disposable tip, a mandrel for holding the tip, a sensor for level sensing fluid, a pump for aspirating fluid and/or dispensing fluid, and tubing/valves. This pipettor function is to aspirate fluid from sample containers or vessels and deliver it to other vessels for analysis.

The analytic unit 108 operates to analyze the samples originally introduced to the sample analyzer 100 in the containers 180 on the racks 102. The analytic unit 108 includes subsystems to transfer vessels, dispense reagents, mix, wash, deliver substrate, and read the chemiluminescence reaction light intensity.

The sample container recognition unit 110 operates to recognize types of containers 180 in the racks 102. An example of the sample container recognition unit 110 is illustrated and described herein.

Figure 2:
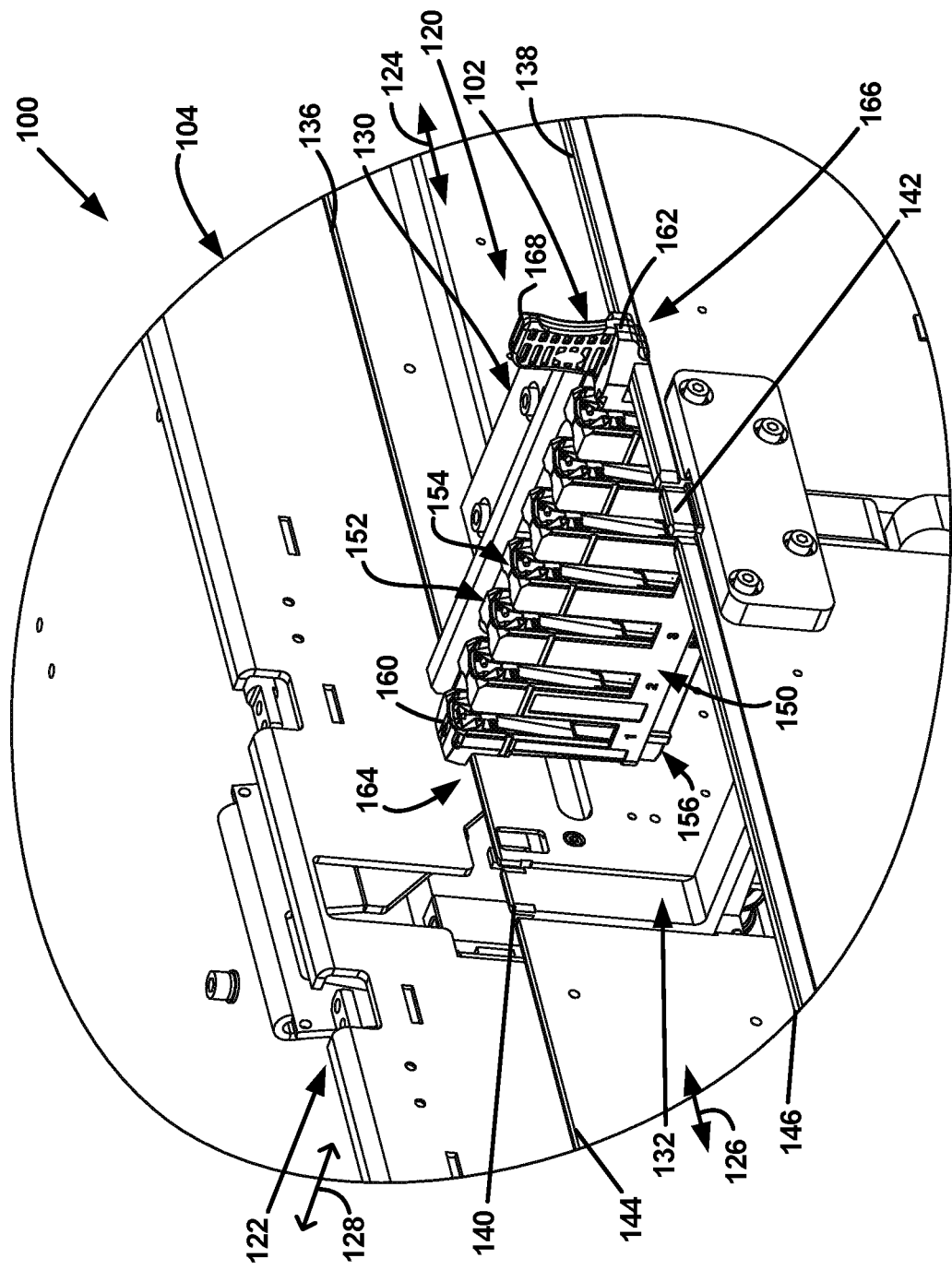
FIG. 2 depicts a perspective view of an exemplary rack installed at a first position in a sample presentation unit (SPU) of the sample analyzer of FIG. 1.
Figure 3:
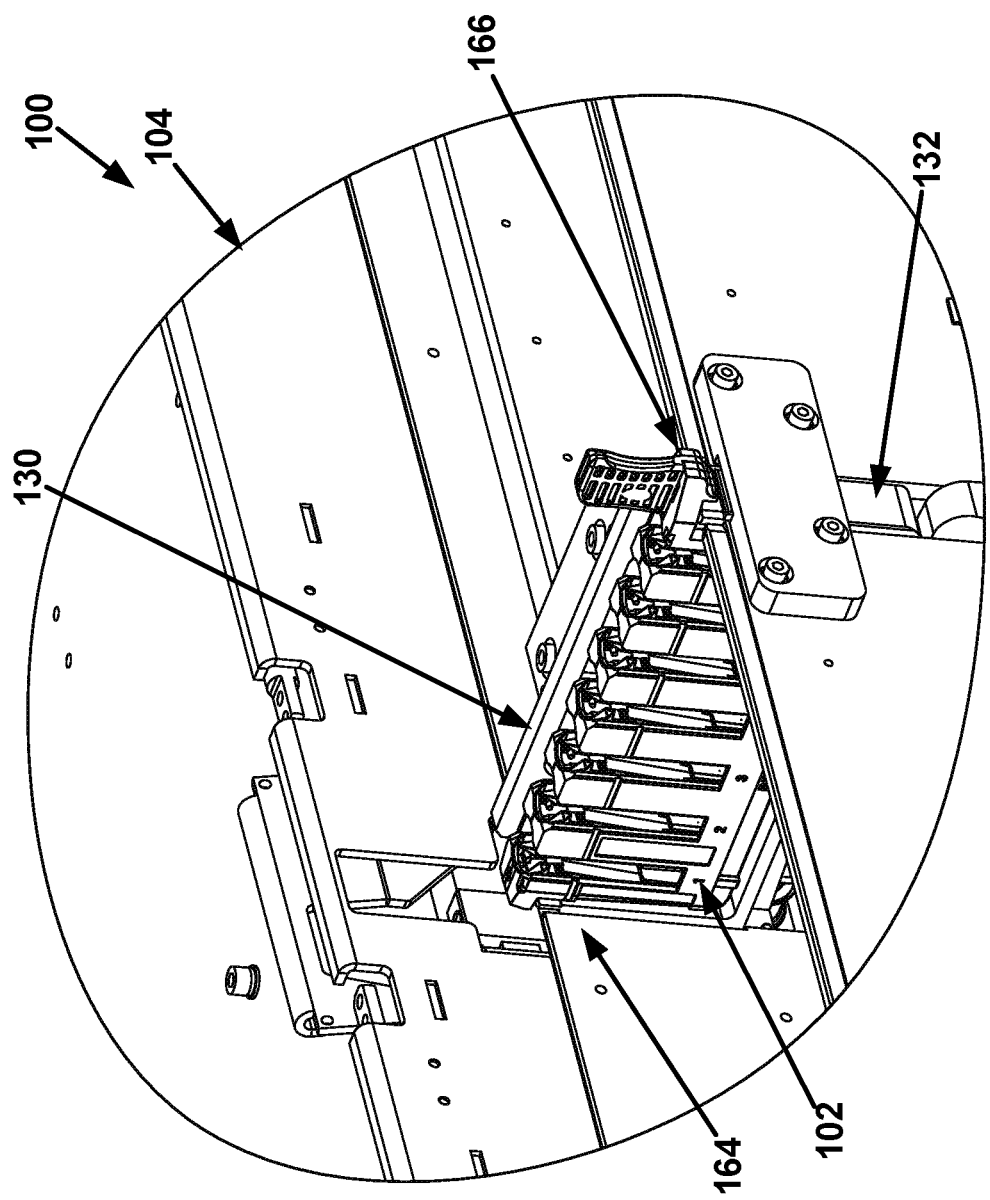
FIG. 3 depicts the perspective view of FIG. 2, but with the rack at a second position in the SPU.
Figure 4:
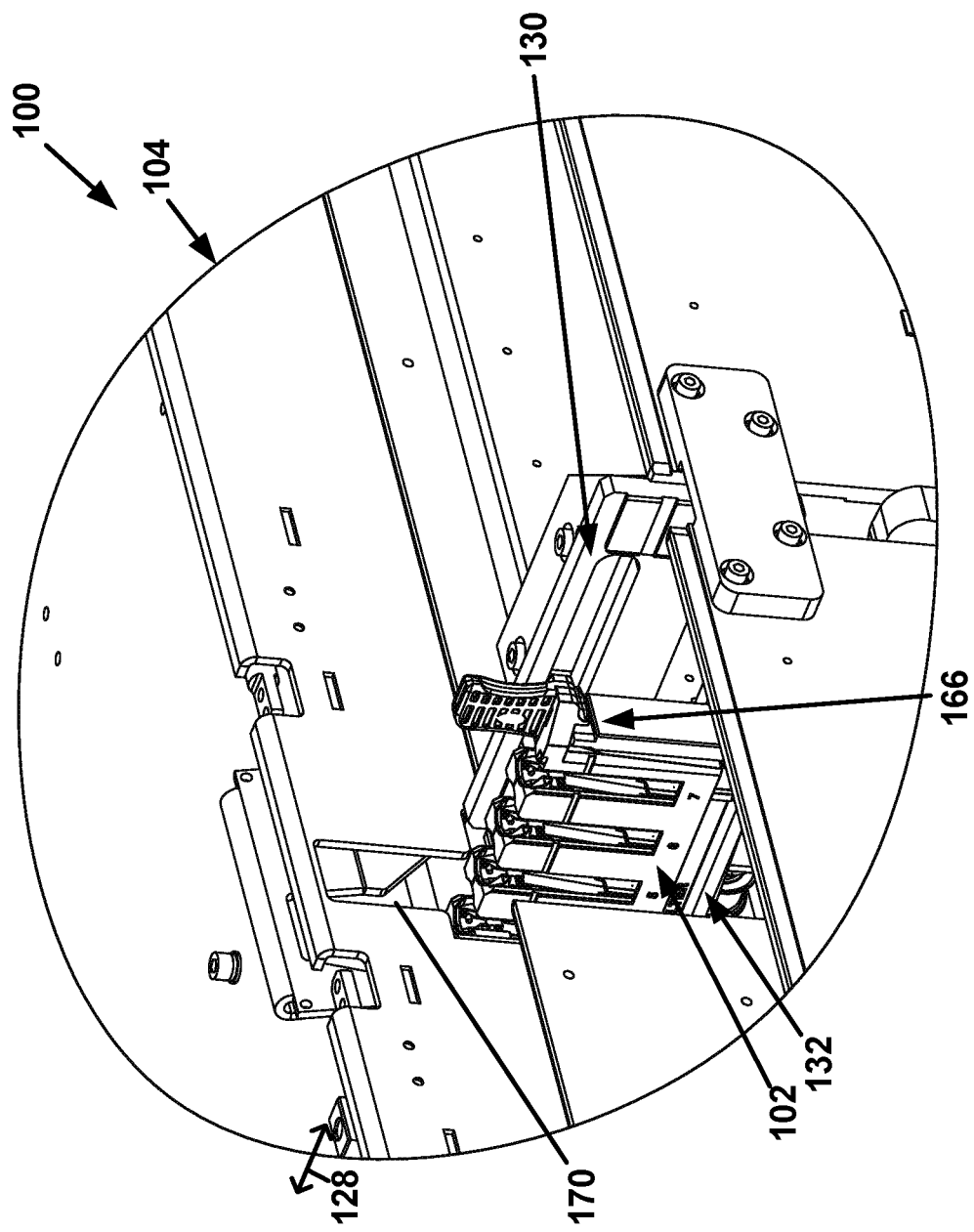
FIG. 4 depicts the perspective view of FIG. 2, but with the rack at a third position where the rack is partially moved out of the second position of the SPU.

Referring to FIGS. 2-4, an example operation of the rack 102 is illustrated, which holds and transfers one or more sample containers 180 in the sample analyzer 100. In particular, FIG. 2 depicts a perspective view of an exemplary rack 102 installed at a first position in the SPU of the sample analyzer 100. FIG. 3 depicts the perspective view of the rack at a second position in the SPU, and FIG. 4 depicts the perspective view of the rack at a third position where the rack is partially moved out of the second position of the SPU. As described below, the rack 102 is located in an onload lane 124 in FIG. 2, at an intersection of the onload lane 124 and a presentation lane 128 in FIG. 3, and in the presentation lane 128 in FIG. 4.

In some embodiments, the rack 102 is loaded with one or more sample containers 180 before the rack 102 is loaded into the sample analyzer 100 (e.g., the SPU 104 thereof). In other embodiments, the rack 102 is loaded with one or more sample containers 180 after the rack 102 has been loaded into the sample analyzer 100 (e.g., the SPU 104 thereof). In yet other embodiments, the rack 102 is partially loaded with one or more sample containers 180 before the rack 102 is loaded into the sample analyzer 100, and one or more additional sample containers 180 can be loaded into the rack 102 afterwards.

The SPU 104 operates to transfer the rack 102, thereby transferring the sample containers 180 held in the rack 102. In some embodiments, the SPU 104 is configured to transfer the rack 102 to various locations or stations in the sample analyzer 100. As illustrated in FIG. 2, the SPU 104 includes a lateral movement section 120 (i.e., an onload-offload lane) and a transverse movement section 122 (i.e., a presentation lane). As depicted, the lateral movement section 120 is substantially perpendicular to the transverse movement section 122. The lateral movement section 120 includes an onload lane 124 and an offload lane 126. A presentation lane 128 of the transverse movement section 122 is positioned between the onload lane 124 and the offload lane 126.

In some embodiments, the lateral movement section 120 includes a pusher 130 to advance the rack 102 along the onload lane 124 and the offload lane 126. The transverse movement section 122 includes a carrier 132 to advance the rack 102 along the presentation lane 128. The onload lane 124 includes a first rail 136 (i.e., onload back rail) and a second rail 138 (i.e., onload front rail). The presentation lane 128 includes a third rail 140 (i.e., a carrier back rail, a first hook holder, etc.) and a fourth rail 142 (i.e., carrier front rail, a second hook holder, etc.). The offload lane 126 includes a fifth rail 144 (i.e., offload back rail) and a sixth rail 146 (i.e., offload front rail). The first rail 136 and the fifth rail 144 are aligned with each other. Likewise, the second rail 138 and the sixth rail 146 are aligned with each other and are substantially parallel to the first rail 136 and the fifth rail 144. When the carrier 132 is at a receiving position (e.g., see FIG. 2), the third rail 140 is aligned with the first rail 136 and the fifth rail 144, and the fourth rail 142 is aligned with the second rail 138 and the sixth rail 146.

The rack 102 can include a mounting feature configured to load the rack 102 into the SPU 104. In some embodiments, the mounting feature includes a first hook 160 arranged at a first end 164 and a second hook 162 arranged at a second end 166 opposite to the first end 164. To load the rack 102 into the SPU 104, the first hook 160 is engaged with the rail 136, 140, and/or 144, and the second hook 162 is engaged with the rail 138, 142, and/or 146. To facilitate placing the rack 102 into the SPU 104, a handle 168 (see, e.g., FIG. 2) is provided to the rack 102 and may be manually grasped by an operator. In some embodiments, the rack 102 may be loaded into the SPU 104 via automated means (e.g., by a robot, a pick-and-place apparatus, etc.).

When a plurality of the racks 102 are held by the SPU 104, the racks 102 are typically loaded into the SPU 104 at the onload lane 124. The racks 102 may thus be stacked within the SPU 104. For example, a front 150 of one of the racks 102 may abut a rear 152 of another of the racks 102. Where more than two of the racks 102 are held by the SPU 104, the front 150 of one of the racks 102 may abut the rear 152 of another of the racks 102 positioned ahead of it, and the rear 152 of the one of the racks 102 may abut the front 150 of another of the racks 102 positioned behind it. A pattern of abutting racks 102 may thus be formed into a stack. A rear 152 of a rearmost rack 102 may abut the pusher 130.

One or more of the racks 102 may be loaded into the SPU 104 at a time. For example, the first hook 160 may be engaged with the rail 136, and the second hook 162 may be engaged with the rail 138 to load the racks 102 into the onload lane 124. If needed, (e.g., when others of the racks 102 are already positioned within the SPU 104), the pusher 130 may be retracted (e.g., moved away from the already positioned racks 102) and thereby make room for the newly added rack(s) 102. Upon the one or more of the racks 102 being loaded into the SPU 104, the pusher 130 may be advanced (e.g., moved toward the racks 102) and thereby remove any excess room between the pusher 130 and the rack(s) 102. One or more of the racks 102 may be loaded into the SPU 104 ahead of, in the middle of, or behind the rack(s) 102 already positioned within the SPU 104.

To move the rack(s) 102 (thereby moving the sample containers loaded thereon) through/into the sample analyzer 100, the pusher 130 may advance the rack(s) 102 and thereby position at least one of the rack(s) 102 into the presentation lane 128 when the carrier 132 is at the receiving position (e.g., see movement between FIGS. 2 and 3). Upon moving from the onload lane 124 to the presentation lane 128, the first hook 160 transfers engagement from the rail 136 to the rail 140, and the second hook 162 transfers engagement from the rail 138 to the rail 142. To further move the rack(s) 102 (thereby further moving the sample containers) through/into the sample analyzer 100 (e.g., through a gate 170 in FIG. 4), the carrier 132 may advance from the receiving position and thereby advance at least one of the rack(s) 102 along the presentation lane 128 (e.g., see movement between FIGS. 3 and 4) further into the sample analyzer 100. Upon reaching a predetermined position within the sample analyzer 100, sample(s) within one or more sample containers may be withdrawn and/or otherwise processed and/or analyzed by and/or within the sample analyzer 100.

To remove the rack(s) 102 (thereby removing the sample containers loaded thereon) through/from the sample analyzer 100, the carrier 132 may retract from the predetermined position to the receiving position and thereby withdraw the at least one of the rack(s) 102 along the presentation lane 128 (e.g., see movement between FIGS. 4 and 3) from the sample analyzer 100. To reach the receiving position (e.g., through the gate 170 in FIG. 4), the carrier 132 positions the at least one of the rack(s) 102 along the lateral movement section 120. The pusher 130 may then advance the rack(s) 102 and thereby position the at least one of the rack(s) 102 into the offload lane 126 when the carrier 132 is at the receiving position (e.g., see movement between FIGS. 2 and 3, but with the pusher 130 or a stack of the racks 102 pushing the at least one of the rack(s) 102 out of the carrier 132 and into the offload lane 126). Upon moving from the presentation lane 128 to the offload lane 126, the first hook 160 transfers engagement from the rail 140 to the rail 144, and the second hook 162 transfers engagement from the rail 142 to the rail 146. To further move the rack(s) 102 (thereby further moving the sample containers) through/from the sample analyzer 100, additional rack(s) 102 may be similarly ejected from the carrier 132 into the offload lane 126 and thereby push the at least one of the rack(s) 102 along the offload lane 126. The racks 102 may similarly be driven off of an end of the offload lane 126 (e.g., into a waste receptacle) and thereby be unloaded from the sample analyzer 100.

Alternatively, to unload the rack 102 from the SPU 104, the first hook 160 may be disengaged from the rail 136, 140, and/or 144, and the second hook 162 may be disengaged from the rail 138, 142, and/or 146. To facilitate removing the rack 102 from the SPU 104, the handle 168 may be manually grasped by the operator. The rack 102 may be unloaded from the SPU 104 via automated means (e.g., by a robot, a pick-and-place apparatus, etc.). A plurality of the racks 102 may be simultaneously held by the offload lane 126 (similar to the onload lane 124). The racks 102 are typically unloaded from the SPU 104 at the offload lane 126.

Referring to FIGS. 5-8, examples of the rack 102 are illustrated, which is loaded with containers 180. In particular, FIG. 5 is an elevation view of an example tube rack, and FIG. 6 is a perspective view of the tube rack of FIG. 5. FIG.

7 is an elevation view of an example cup rack, and FIG. 8 is a perspective view of the cup rack of FIG. 7.

Figure 21A:
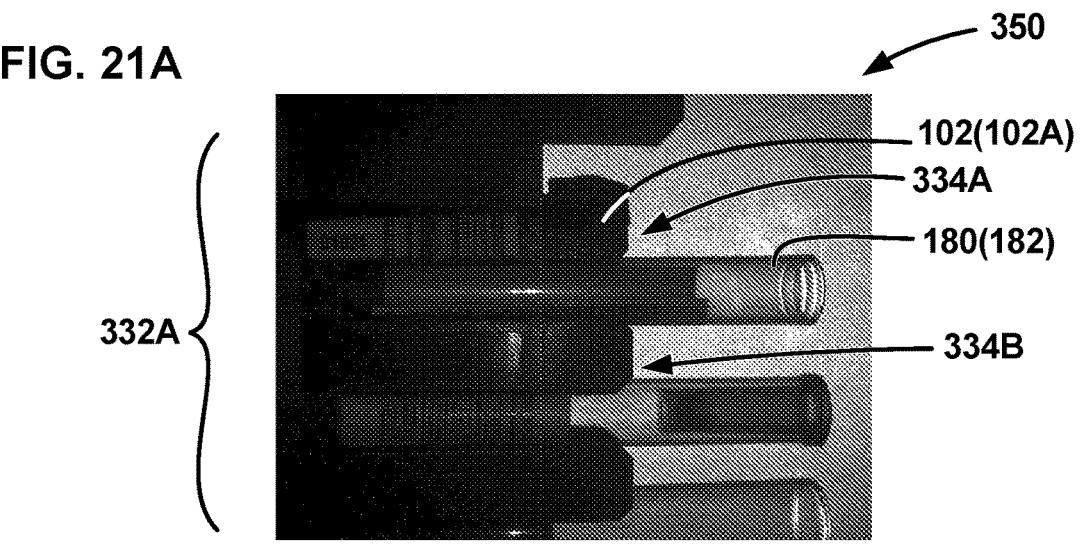
FIG. 21A is a low exposure monochromatic image of a portion of a tube rack with sample tubes.
Figure 21B:
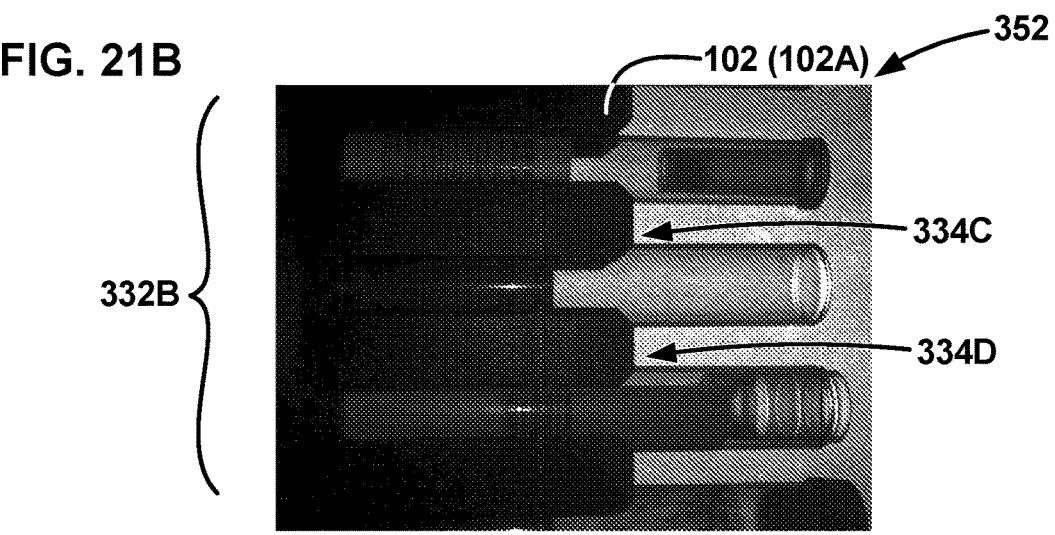
FIG. 21B is a low exposure monochromatic image of another portion of the tube rack with sample tubes.
Figure 21C:
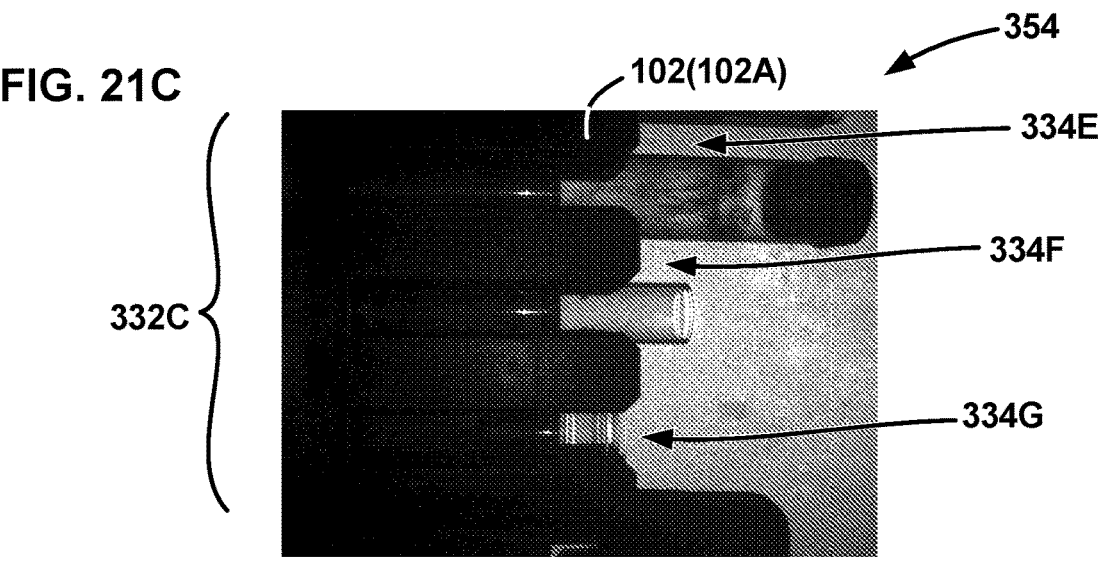
FIG. 21C is a low exposure monochromatic image of yet another portion of the tube rack with sample tubes including one sample tube with a cap.

The rack 102 includes rack slots 190 which can be loaded with containers 180. The rack slots 190 can define container positions 334 as illustrated in FIG. 21A-21C below.

In some embodiments, the rack 102 includes a tube rack 102A as illustrated in FIGS. 5 and 6. In the illustrated example, the tube rack 102A is loaded tubes 182 (i.e., examples of the containers 180) having different sizes, such as first tubes 182A, second tubes 182B, and third tubes 182C. In this example, one of the rack slots 190 is left empty in the tube rack 102A. As described herein, different types of tubes 182 can be identified by the sample container recognition unit 110.

In other embodiments, the rack 102 includes a cup rack 102B as illustrated in FIGS. 7 and 8. In the illustrated example, the cup rack 102B is loaded with cups 184 (i.e., examples of the containers 180) having different sizes, such as a first cup 184A, a second cup 184B, and a third cup 184C. In this example, four of the rack slots 190 are left empty in the cup rack 102B. As described herein, different types of cups 184 can be identified by the sample container recognition unit 110.

Figure 9:
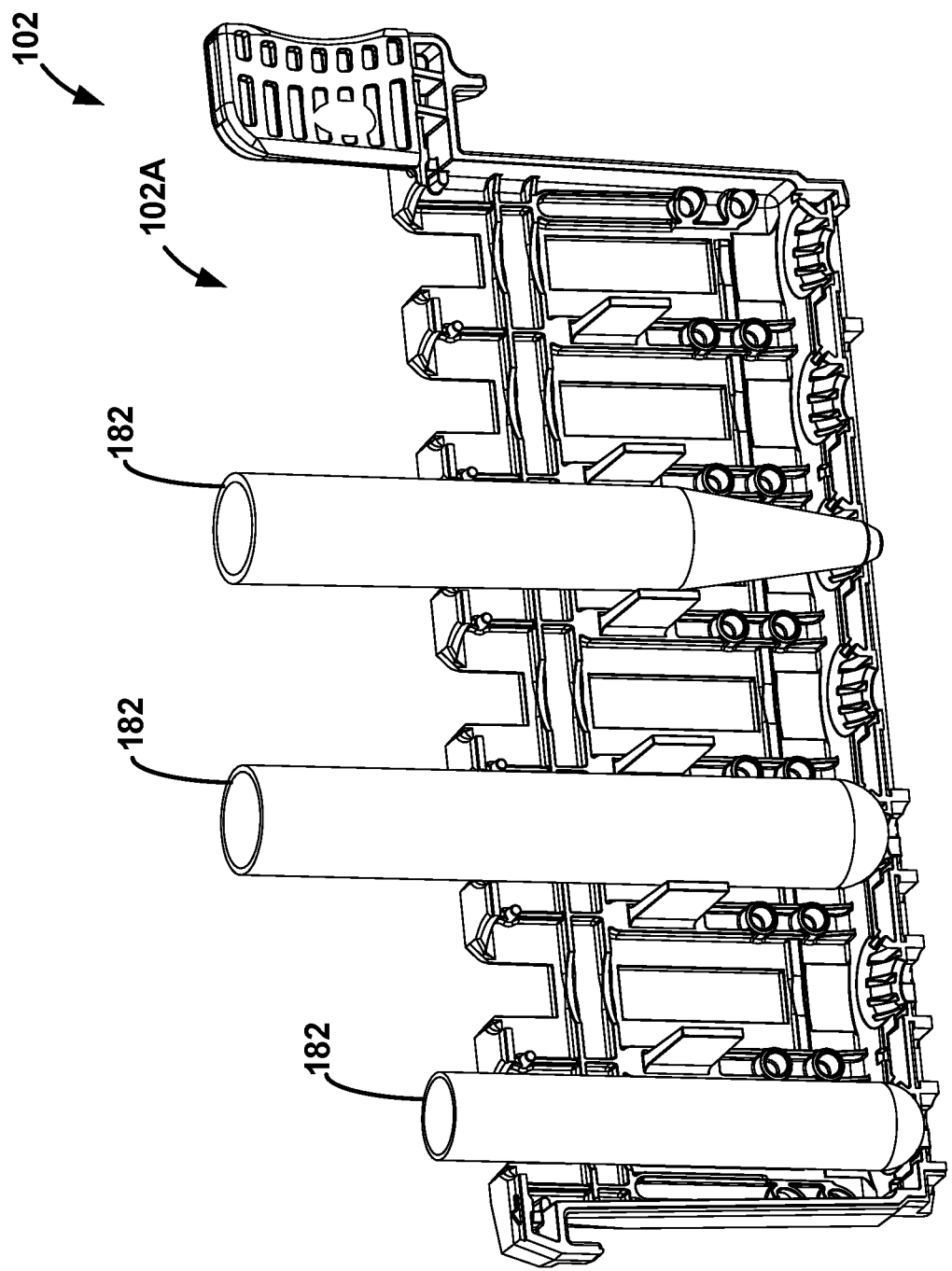
FIG. 9 is a perspective cut-away view of the tube rack of FIG. 5 with a plurality of sample tubes of different types.

FIG. 9 is a perspective cut-away view of the rack 102, such as a tube rack 102A of FIGS. 5 and 6, which holds various types of sample tubes 182. As illustrated, the tube rack 102A is configured to receive sample tubes 182 of different dimensions.

FIGS. 10-13 illustrate various types of sample cups 184. As illustrated, sample cups 184 may be of various types, and the cup rack 102B is configured to receive such sample cups 184 of different dimensions.

Referring to FIGS. 14-18, an example of the sample container recognition unit 110 is described with respect to the rack 102. In FIGS. 14-18, the sample container recognition unit 110 is primarily illustrated with respect to the tube rack 102A. It is understood, however, that the sample container recognition unit 110 can also be used and operated similarly with respect to the cup rack 102B.

Figure 14:
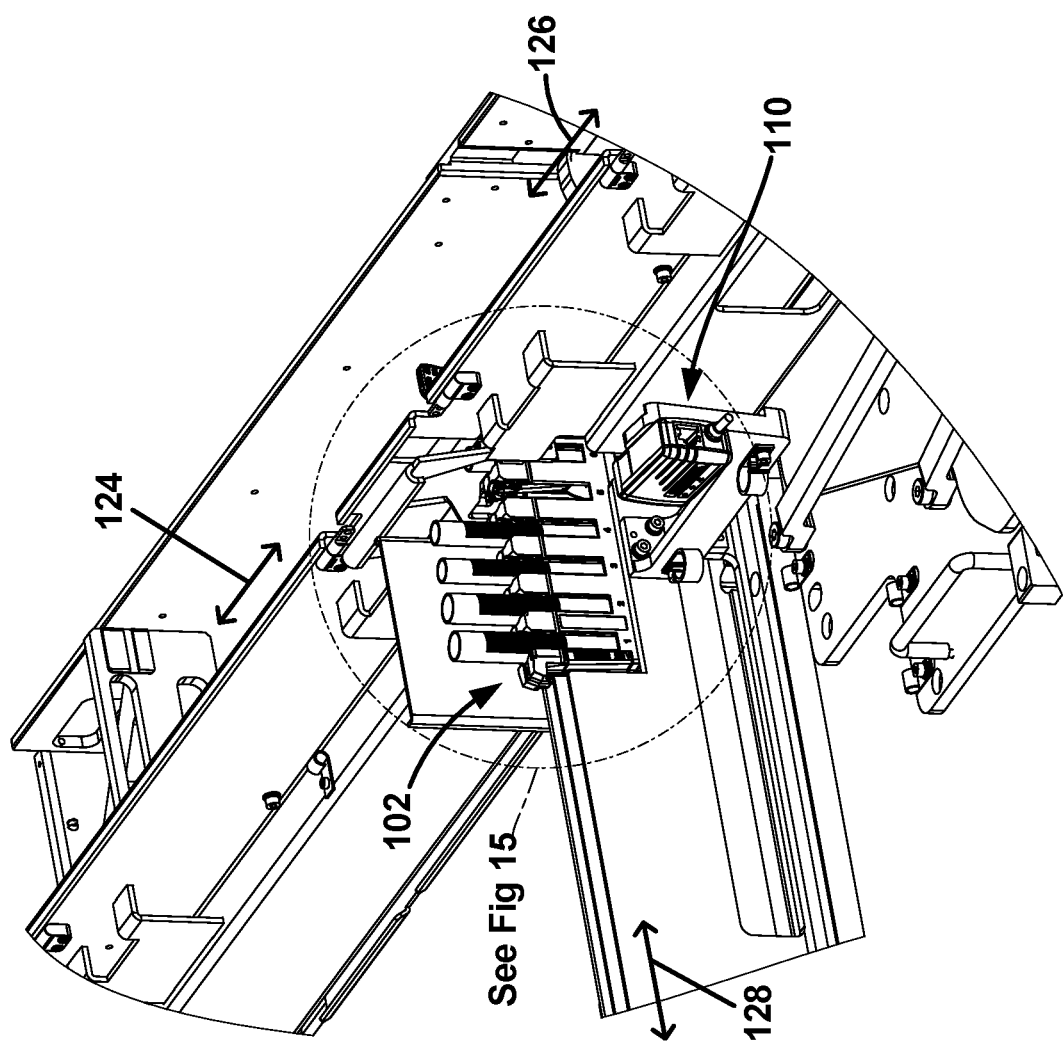
FIG. 14 is a perspective view of the tube rack located in a presentation lane of the SPU.
Figure 15:
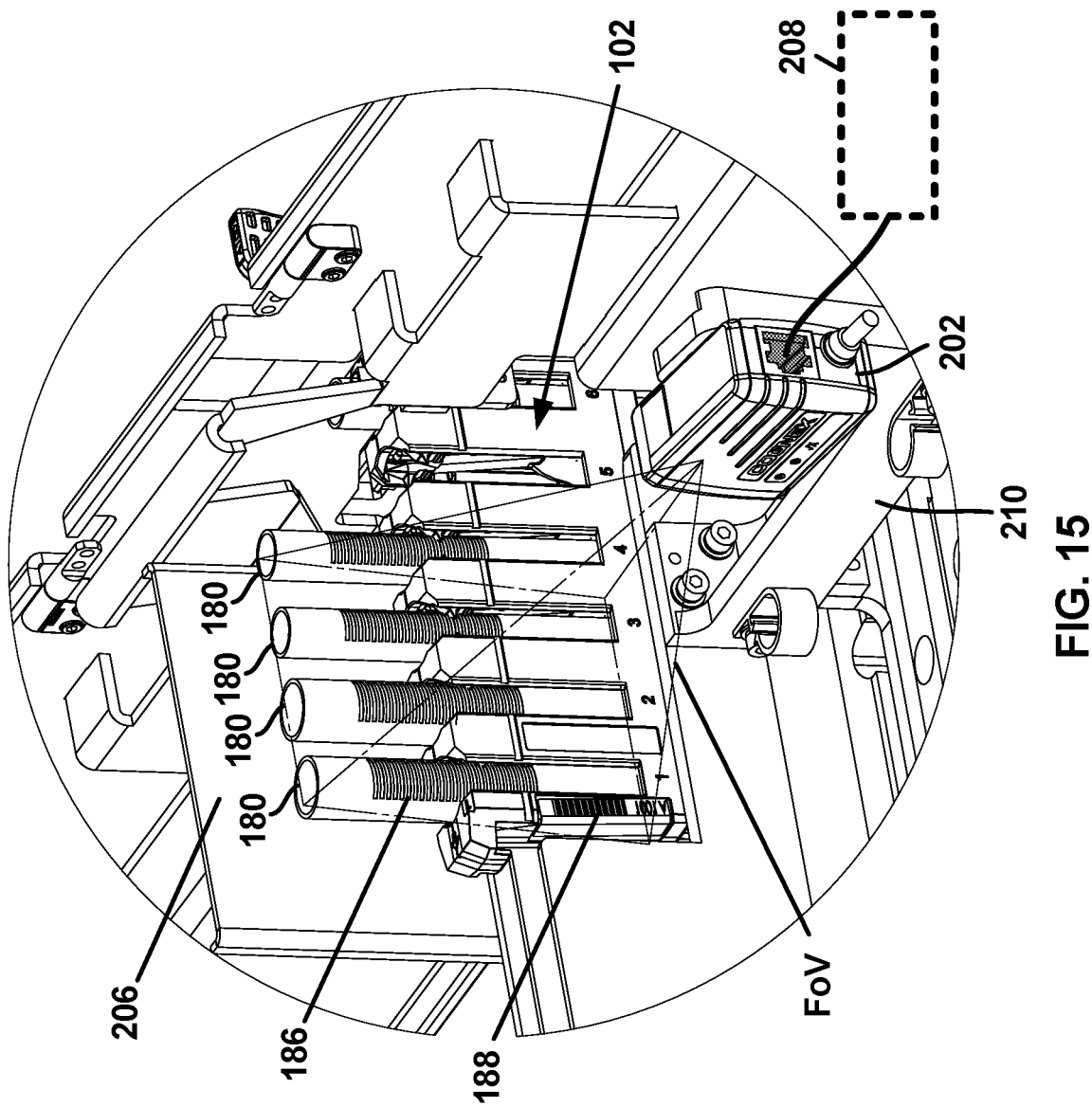
FIG. 15 is an enlarged portion of the perspective view of FIG. 14.
Figure 16:
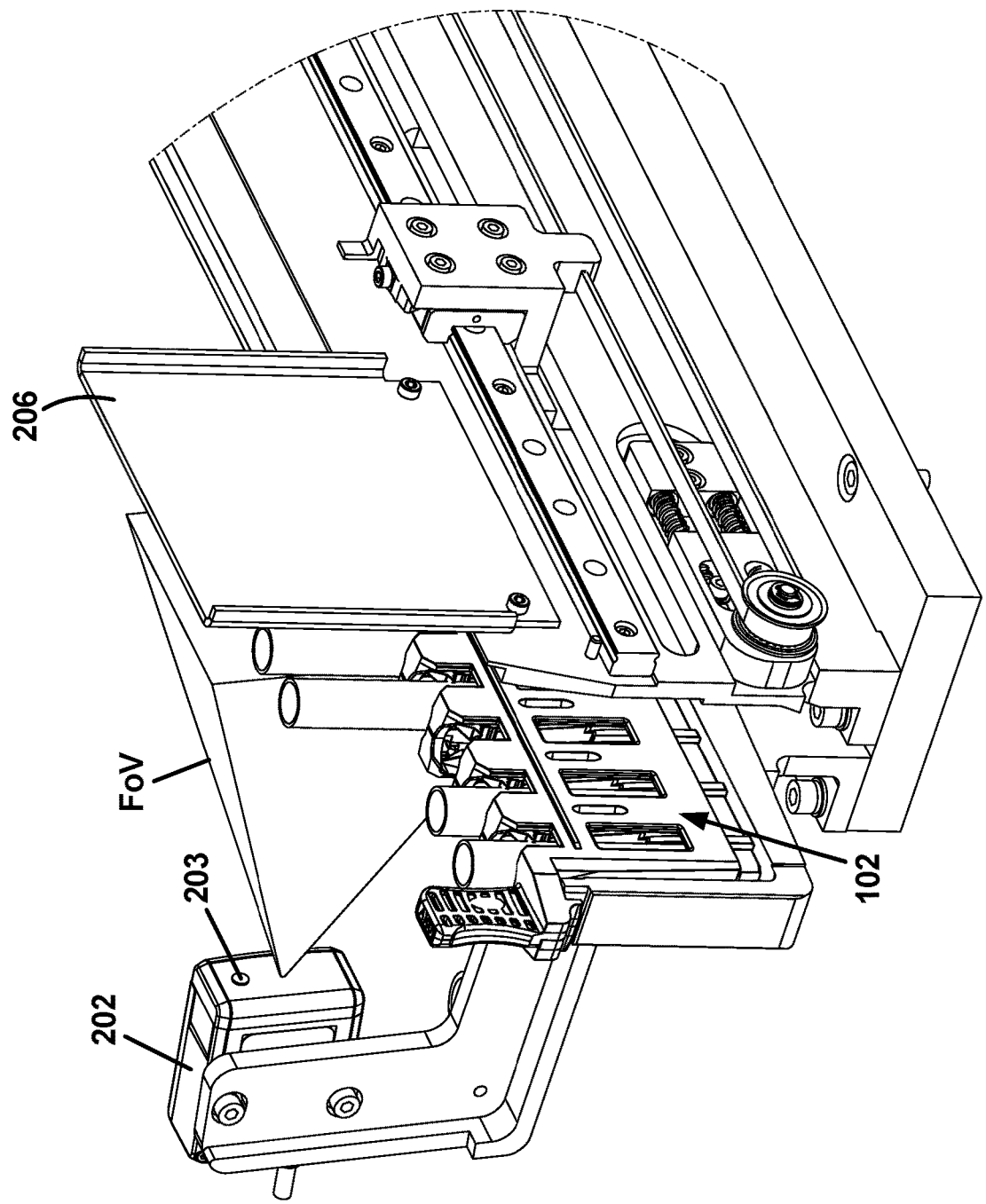
FIG. 16 is another perspective view of the tube rack located in the presentation lane of the SPU partially in view of a camera unit.
Figure 17:
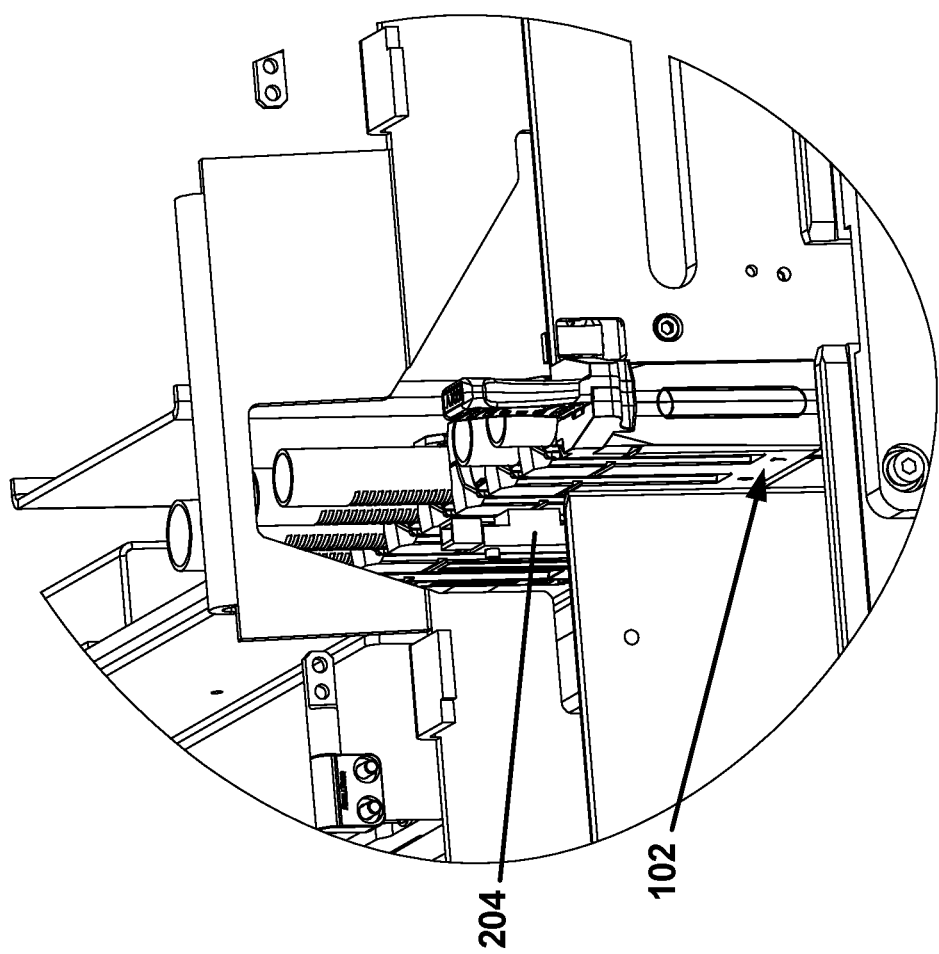
FIG. 17 is yet another perspective view of the tube rack located in the presentation lane of the SPU partially in view of a container detection unit.

In particular, FIG. 14 is a perspective view of the tube rack 102 located in the presentation lane 128 of the SPU 104. FIG. 15 is an enlarged view of the tube rack 102 of FIG. 14. In FIGS. 14 and 15, the tube rack 102 is shown partially in view of a camera unit of the sample container recognition unit 110. FIG. 16 is another perspective view of the tube rack 102 located in the presentation lane 128 of the SPU 104 partially in view of the camera unit of the sample container recognition unit 110. FIG. 17 is yet another perspective view of the tube rack 102 located in the presentation lane 128 of the SPU 104 partially in view of a container detection unit of the sample container recognition unit 110.

The sample container recognition unit 110 operates to identify the containers 180 in the rack 102 and detect various characteristics associated with the containers 180, which are used to determine the types of the containers 180. For example, the sample container recognition unit 110 operates to detect a container barcode 186 provided to a container 180. The container barcode 186 is used to verify the container 180 in the rack 102, as described herein. The container barcode 186 can be provided to any suitable location of the container 180. In the illustrated examples of FIGS. 5, 6, and 15, the container barcode 186 is provided to an exterior of the sample tube 182. The container barcode 186 can be similarly provided to an exterior of the sample cup 184.

In addition, the sample container recognition unit 110 operates to identify the rack 102. For example, the sample container recognition unit 110 operates to detect a rack barcode 188 provided to the rack 102. The rack barcode 188 is used to verify the rack 102 as described herein. The rack barcode 188 can be provided to any suitable location of the rack 102. In the illustrated examples of FIGS. 5, 6, and 15, the rack barcode 188 is arranged on the front of the rack 102 adjacent to the first end 164 of the rack 102. Other locations in the rack 102 are also possible for the rack barcode 188. The rack barcode 188 can be provided on the tube racks 102A and/or the cup racks 102B.

In some embodiments, the sample container recognition unit 110 includes a camera unit 202, a container detection unit 204, a screen 206, and a computing device 208. The camera unit 202 can be secured to the SPU 104 using a mounting bracket 210.

The camera unit 202 operates to detect and identify the rack 102 and the containers 180 in the rack 102, and determine characteristics of the rack 102 and the containers 180 therein. Such characteristics of the containers 180 can be used to identify types of the containers 180, as discussed herein. The camera unit 202 is arranged in front of the rack 102 that is movable relative to the camera unit 202.

As described herein, the camera unit 202 can operate to read barcodes associated with the rack 102 and the containers 180 therein. Further, the camera unit 202 operates to locate, analyze, and inspect the rack 102 and the containers 180 therein. The camera unit 202 can be connected to the computing device 208 for various processes. One example of the camera unit 202 includes ADVANTAGE 100 SERIES, which is available from Cognex Corporation (Natick, Mass.).

The camera unit 202 can be supported in the sample analyzer 100 with the mounting bracket 210. The mounting bracket 210 is configured to space the camera unit 202 from the rack 102 and to position the camera unit 202 relative to transient location(s) of the rack 102 to enable the camera unit 202 to have a field of view (FOV) on the container 180 and/or rack 102 being examined. An example of the mounting bracket 210 is further described and illustrated with reference to FIG. 18.

The camera unit 202 can include a light source 203, such as a LED light, which is operable to emit light toward the rack 102 (and toward the screen 206). The screen 206 is used to cast light back in the direction of the field of view (FOV) of the camera unit 202 by reflecting light toward the camera's aperture. One example of the camera unit 202 includes a model named ADVANTAGE 102, such as part number ADV102-CQBCKFS1-B, which is available from Cognex Corporation (Natick, Mass.).

The container detection unit 204 operates to detect whether a container 180 is present in the rack 102. The container detection unit 204 is arranged to scan the rack 102 as the rack 102 moves relative to the container detection unit 204. In the illustrated example, the container detection unit 204 is arranged at one side of the rack 102 while the other side of the rack 102 faces the camera unit 202. As described herein, the container detection unit 204 can detect the rack 102 partially or entirely and determine whether any container position (e.g., the container positions 334 as illustrated in FIGS. 21A-21C) of the rack 102 is empty or not.

Various sensors can be used for the container detection unit 204. In some examples, the container detection unit 204 includes a photosensor of various types. For example, the container detection unit 204 includes a reflector-type photosensor (also referred to as a reflective photointerrupter or a photoreflector), which positions a light emitting element and a light receiving element on the same surface (so that they face the same direction) and is configured to detect presence and position of an object based on the reflected light from a target object. One example of such a reflector-type photosensor is GP2A25J0000F Series, which is available from Sharp Corporation (Osaka, Japan). Other types of photosensors can also be used for the container detection unit 204, such as a photointerrupter (also referred to as a transmission-type photosensor), which consists of a light emitting element and a light receiving element aligned facing each other in a single package, and which works by detecting light blockage when a target object comes between both of the elements.

The screen 206 is arranged and used with the camera unit 202 to improve image capturing of the camera unit 202. The screen 206 is arranged to be opposite to the camera unit 202 so that the rack 102 is positioned between the camera unit 202 and the screen 206. The screen 206 is used to cast light back in the direction of the field of view (FOV) of the camera unit by reflecting light toward the camera's aperture.

The screen 206 is made of one or more various materials which can provide different reflection intensities. Further, the screen 206 includes a material configured to increase a scanning range of barcodes. For example, the screen 206 includes a retroreflective sheeting, one example of which includes 3M™ Scotchlite™ Sheeting 7610, available from 3M Company (Maplewood, Minn.).

The computing device 208 is connected to the camera unit 202 and operates to process the data transmitted from the camera unit 202, such as image processing and evaluation. In addition, the computing device 208 is connected to the container detection unit 204 and operates to detect whether a container is present in the rack. The computing device 208 can include at least some of the components included in an example computing device as illustrated and described with reference to FIG. 34.

In some embodiments, the computing device 208 executes a software application that processes and evaluates images from the camera unit 202 and determines various characteristics associated with the rack 102 and/or the containers 180 in the rack 102. One example of such a software application is Cognex In-Sight Vision Software, available from Cognex Corporation (Natick, Mass.), which provides various tools, such as edge detection ("Edge"), pattern matching ("Pattern Match"), histogram analysis ("Histogram"), and barcode detection ("ReadIDMax").

Figure 18:
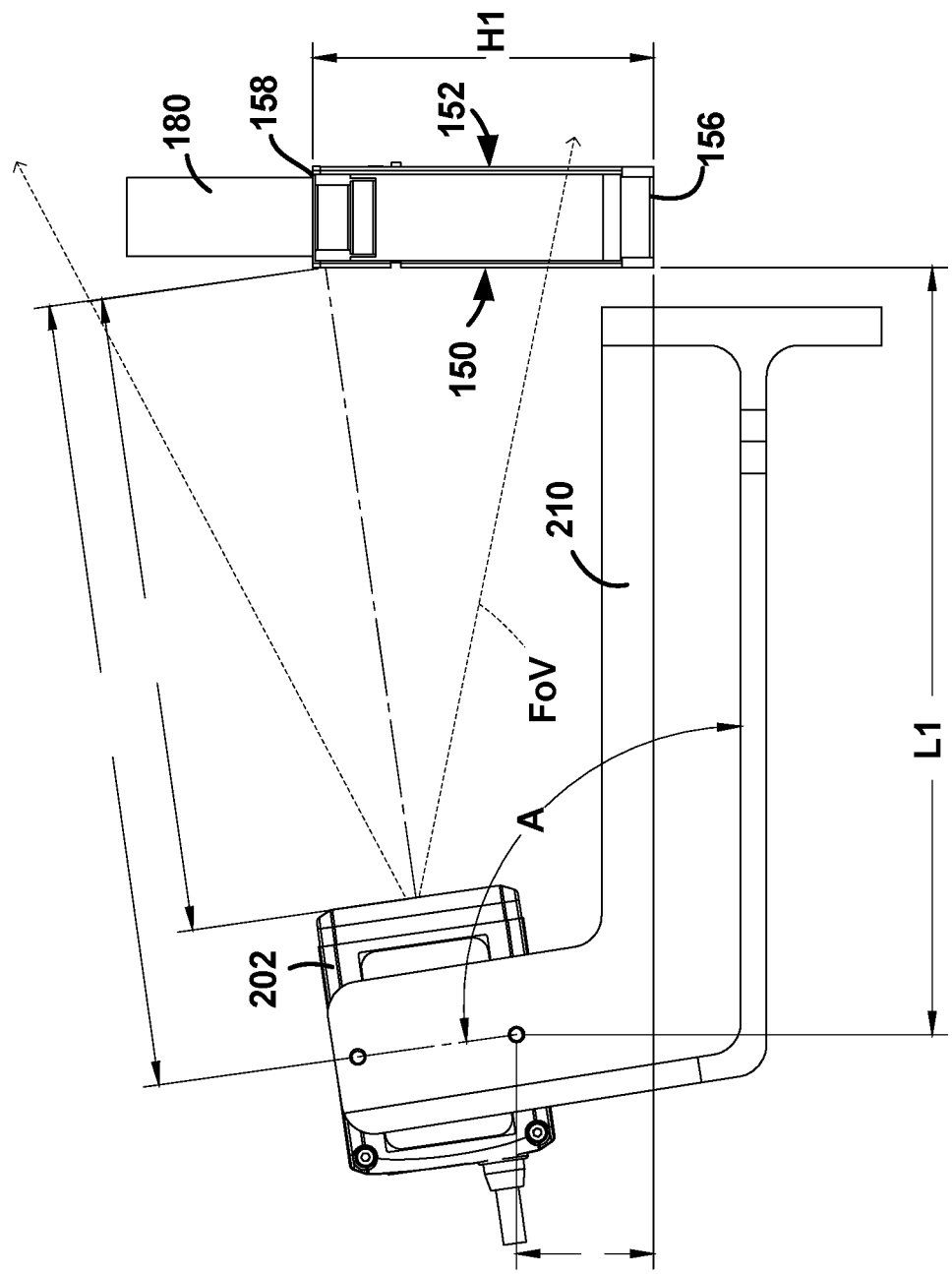
FIG. 18 is an elevation view illustrating an example configuration of a camera unit with a mounting bracket.

Referring to FIG. 18, the mounting bracket 210 is configured to arrange the camera unit 202 in front of the rack 102 and to face the front 150 of the rack 102. The camera unit 202 is spaced apart from the front 150 of the rack 102 at a distance L1, which can range from about 100 mm to about 200 mm while the rack 102 has a height H1 which can range from about 50 mm to about 100 mm. The height H1 of the rack 102 can be defined as a distance between a bottom 156 and a top 158 of the rack 102 (see also FIG. 5). In some embodiments, the mounting bracket 210 is configured to support the camera unit 202 at an angle A relative to the bottom 156 of the rack 102 such that the field of view (FOV) covers the entire height of the containers 180 received in the rack 102. The angle A can range from about 90 degrees to about 120 degrees, in some embodiments. Other ranges for the distance L1, the height H1, and the angle A are also possible in other embodiments.

Figure 19:
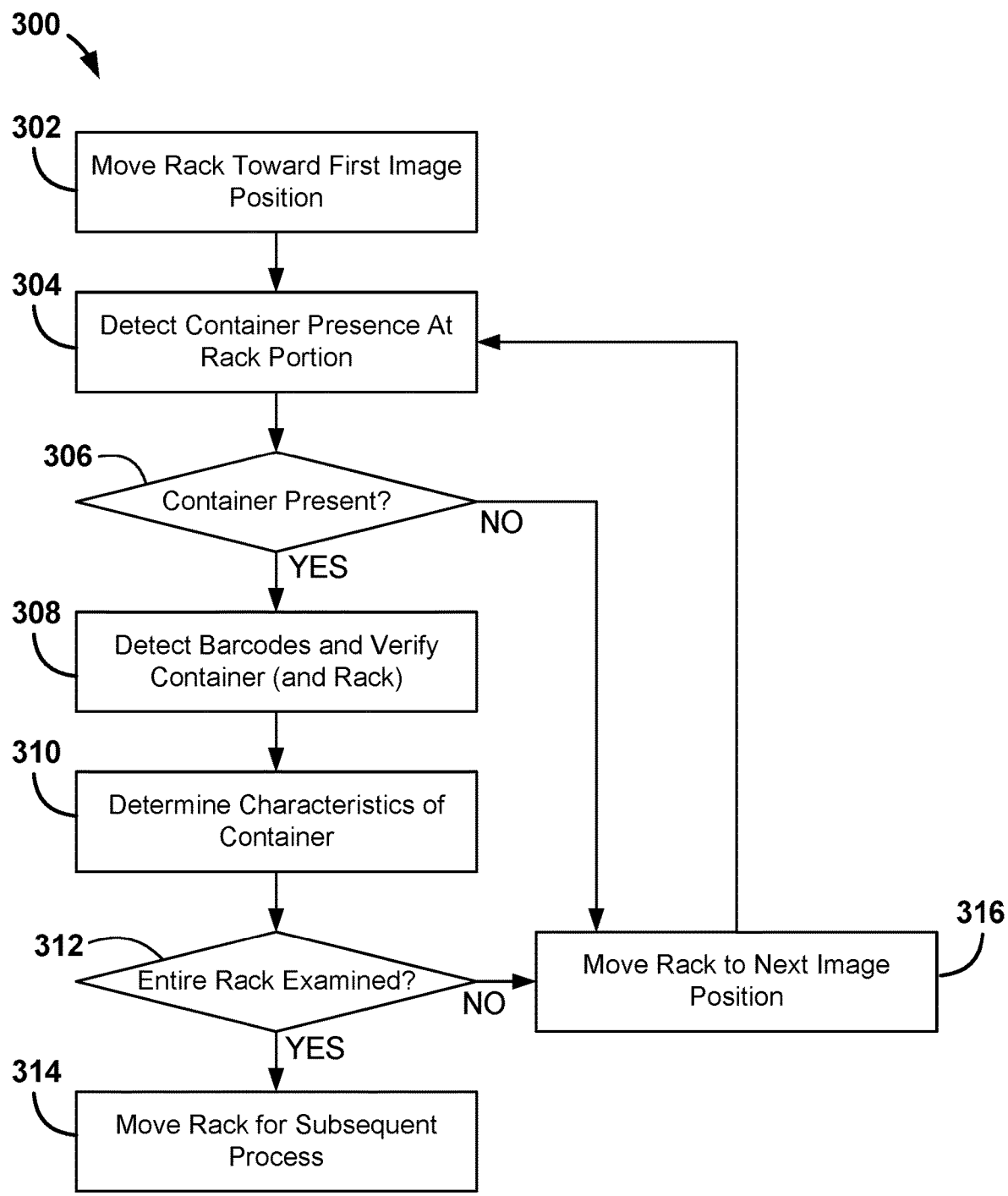
FIG. 19 is a flowchart of an example method for performing sample container recognition with respect to a rack.

FIG. 19 is a flowchart of an example method 300 for performing sample container recognition with respect to a rack 102. In some embodiments, the method 300 can be at least partially performed by the sample container recognition unit 110 with associated devices in the sample analyzer 100. The method 300 is described with reference also with FIGS. 20-23.

The method 300 can start at operation 302 in which the rack 102 is operated to move toward a first image position 330A with respect to the sample container recognition unit 110.

The rack 102 is movable to a plurality of predetermined image positions 330 relative to the sample container recognition unit 110 so that different portions of the rack 102 are viewed and captured by the sample container recognition unit 110. For example, the camera unit 202 of the sample container recognition unit 110 can have a field of view (FOV) that is limited to only a portion of the rack 102. Therefore, to examine the entire rack 102 (i.e., all rack slots 190 of the rack 102), the rack 102 is moved relative to the camera unit 220 so that the camera unit 220 captures a plurality of images at a plurality of positions (i.e., the image positions 330). Each of the images shows a portion of the rack 102 at a particular position (i.e., a particular image position) of the rack 102. Each portion (i.e., rack portion 332) of the rack 102 can include one or more container positions 334 in which one or more containers 180 are received, respectively. As described herein, the container positions 334 of the rack 102 correspond to the rack slots 190 of the rack 102.

Figure 20:
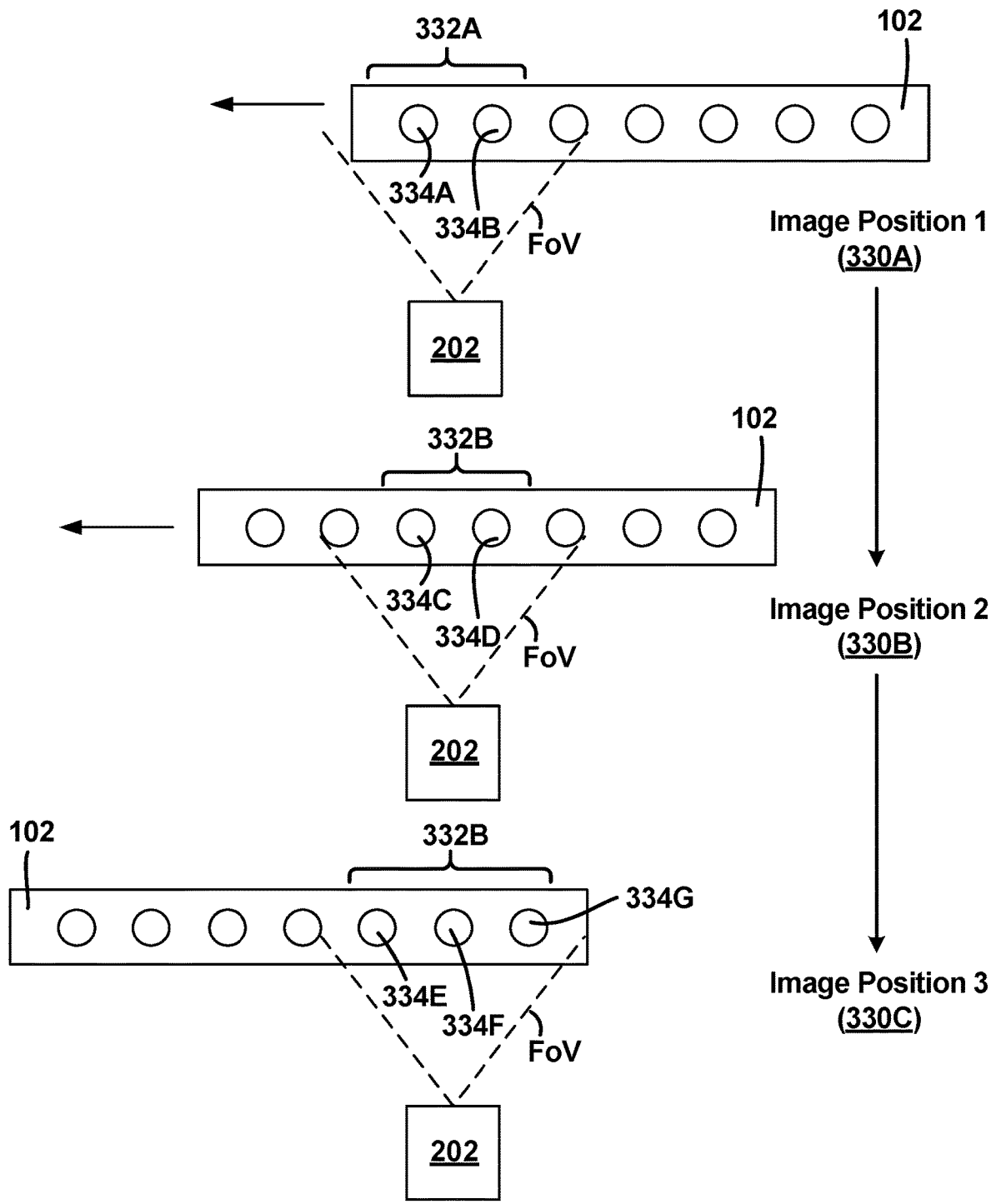
FIG. 20 is a schematic diagram illustrating different image positions for the rack.

As illustrated in FIG. 20, in some embodiments, the rack 102 has three image positions 330 (such as a first image position 330A, a second image position 330B, and a third image position 330C). In each of the image positions 330, the camera unit 202 is configured to have a field of view (FOV) that captures a portion (i.e., a rack portion) 332 of the rack 102. In the illustrated example, the camera unit 202 can capture an image of a first rack portion 332A when the rack 102 is in the first image position 330A, an image of a second rack portion 332B when the rack 102 is in the second image position 330B, and an image of a third rack portion 332C when the rack 102 is in the third image position 330C. The image of each rack portion 332 can show one or more container positions 334.

In the illustrated example of FIGS. 21A-21C, a first image 350 is captured when the rack 102 is in the first image position 330A. The first image 350 shows the first rack portion 332A of the rack 102 that includes first and second container positions 334A and 334B in the rack 102. A second image 352 is captured when the rack 102 is in the second image position 330B. The second image 352 shows the second rack portion 332B of the rack 102 that includes third and fourth container positions 334C and 334D in the rack 102. A third image 354 is captured when the rack 102 is in the third image position 330C. The third image 354 shows the third rack portion 332C of the rack 102 that includes fifth, sixth, and seventh container positions 334E, 334F, and 334G in the rack 102.

Figure 22:
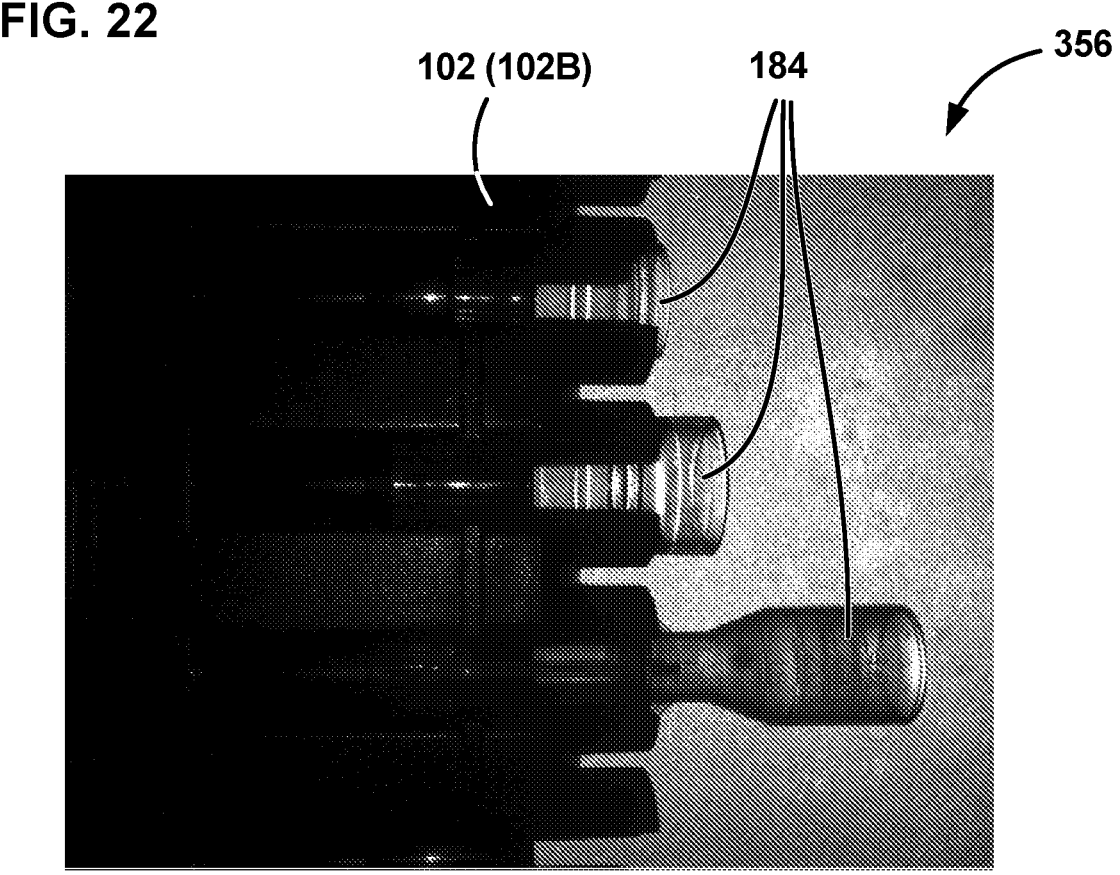
FIG. 22 is a low exposure monochromatic image of a portion of a cup rack with sample cups.

In some embodiments, the images 350, 352, and 354 captured by the camera unit 202 of the sample container recognition unit 110 can be low exposure monochromatic images. The images 350, 352, and 354 illustrated in FIGS. 21A-21C are for the tube rack 102A with sample tubes 182. FIG. 22 illustrates an image 356 of a portion of the cup rack 102B with sample cups 184.

At operation 304, as the rack 102 is moved toward the first image position 330A, it is detected whether one or more containers 180 are present in a rack portion 332A of the rack 102. As described herein, the container detection unit 204 can operate to perform container presence detection. The rack portion 332A is a portion of the rack 102 that is included in a field of view (FOV) of the camera unit 202 of the sample container recognition unit 110 at or adjacent the first image position 330A. In some embodiments, the container detection unit 204 can operate to detect the container presence in the rack portion (e.g., the first rack portion 332A) of the rack 102 as the rack 102 moves toward the first image position 330A. In other embodiments, the container presence can be detected when the rack 102 is located adjacent or at the first image position 330A.

At operation 306, it is determined whether any container 180 is present in the rack portion 332A of the rack 102. If any container 180 is present ("YES" at this operation), the method 300 moves on to operation 308. If no container 180 is detected ("NO" at this operation), the method 300 moves to operation 316 in which the rack 102 moves to a next image position 330 (e.g., 330B after 330A). As such, if no container is found at a particular image position 330, the rack 102 can bypass that particular image position. For example, the rack 102 can skip to a next image position 330 without performing container recognition operations (such as operations 308 and 310) at the particular image position, thereby saving time and resources.

Figure 23A:
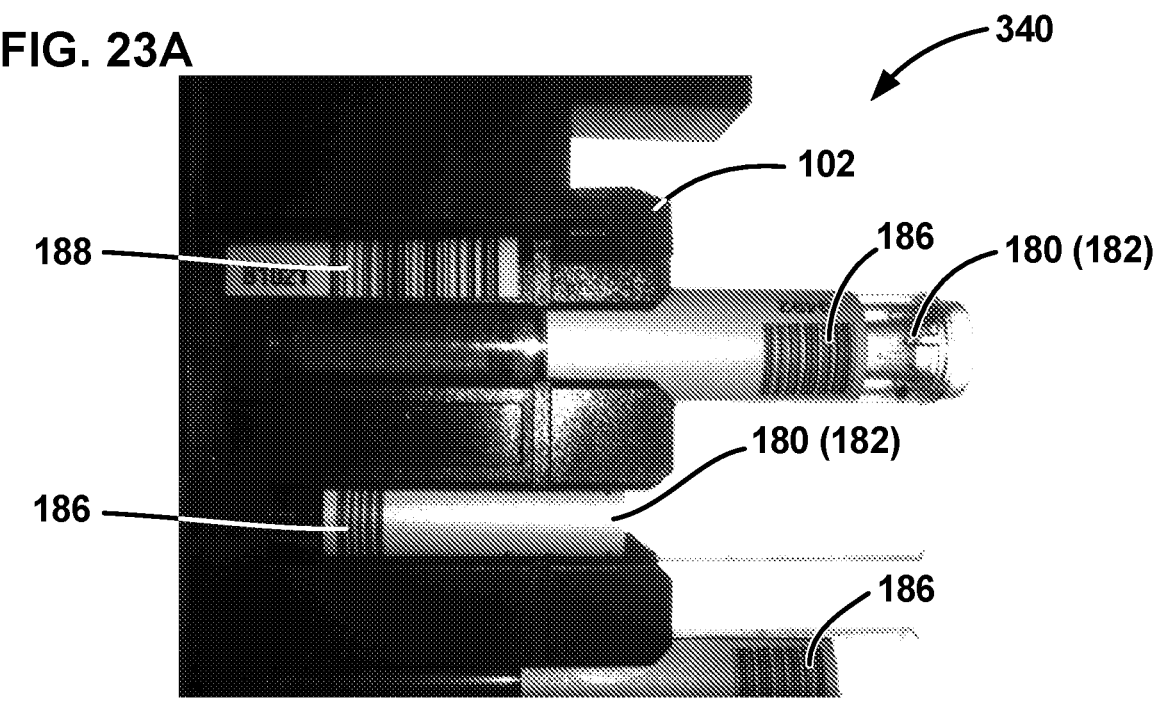
FIG. 23A is a high exposure monochromatic image of a portion of the tube rack with sample tubes.

At operation 308, the sample container recognition unit 110 operates to detect one or more container barcodes 186 associated with the containers 180. The sample container recognition unit 110 can further operate to verify the containers 180 based on the detected container barcodes 186. In some embodiments, the rack 102 stops at the image position 330 for the barcode detection. For example, as illustrated in FIG. 23A, the sample container recognition unit 110 (e.g., the camera unit 202 thereof) operates to capture an image 340 of a portion of the rack 102 with the sample tubes 182. In some embodiments, the image 340 is a high exposure monochromatic image for barcode detection. Once the image 340 is captured, the sample container recognition unit 110 operates to identify the container barcodes 186 in the image 340 and read the container barcodes 186 to verify the containers 180 (i.e., the sample tubes 182 in this example). As illustrated with rectangular boxes 344 in FIG. 23B, the container barcodes 186 are identified in the image 340. Various image processing methods can be used to identify and read the container barcodes. One example of such image processing methods is Cognex In-Sight Vision Software, available from Cognex Corporation (Natick, Mass.), which provides various tools, such as edge detection ("Edge"), pattern matching ("Pattern Match"), histogram analysis ("Histogram"), and barcode detection ("ReadIDMax").

In addition, the sample container recognition unit 110 can operate to detect a rack barcode 188 provided to the rack 102, and verify the rack 102 based on the rack barcode 188. The rack barcode 188 is detected and read in a similar manner to the container barcode 186 as described above. For example, as illustrated in FIG. 23A, the image 340 captured by the sample container recognition unit 110 (e.g., the camera unit 202 thereof) can include a portion of the rack 102 having the rack barcode 188. Once the image 340 is captured, the sample container recognition unit 110 operates to identify the rack barcodes 188 in the image 340 and read the rack barcodes 188 to verify the containers 180. As illustrated with a rectangular box 346 in FIG. 23B, the rack barcode 188 is identified in the image 340. Various image processing methods can be used to identify and read the rack barcode. One example of such image processing methods is Cognex In-Sight Vision Software, available from Cognex Corporation (Natick, Mass.), which provides various tools, such as edge detection ("Edge"), pattern matching ("Pattern Match"), histogram analysis ("Histogram"), and barcode detection ("ReadIDMax").

At operation 310, the sample container recognition unit 110 operates to determine characteristics of the containers 180. In some embodiments, the rack 102 remains stationary for determining the container characteristics. As described herein, the sample container recognition unit 110 operates to process the images of the rack 102 with containers 180 (such as the images 350, 352, 354, and 356 in FIGS. 21A-21C and 22), and determine various characteristics associated with the containers 180, such as the dimension (e.g., height and width) of each container and the presence of a cap on the container. Such characteristics can be used to identify the type of the container, as described in more detail below. Various image processing methods can be used to determine such characteristics of the containers in the rack. One example of such image processing methods is Cognex In-Sight Vision Software, available from Cognex Corporation (Natick, Mass.), which provides various tools, such as edge detection ("Edge"), pattern matching ("Pattern Match"), histogram analysis ("Histogram"), and barcode detection ("ReadIDMax").

At operation 312, it is determined whether the entire rack 102 has been examined. In some embodiments, it is determined whether the rack 102 has moved through all of predetermined image positions 330. In other embodiments, it is determined whether all the rack portions 332 of the rack 102 have been captured by the camera unit 202. In yet other embodiments, it is determined whether all the container positions 334 of the rack 102 have been captured by the camera unit 202.

If it is determined that the entire rack 102 has been examined ("YES" at this operation), the method 300 moves to operation 314 in which the rack 102 is moved to another location within or outside the sample analyzer 100 for subsequent processes. Otherwise ("NO" at this operation), the method 300 moves to operation 316 in which the rack 102 moves to a next image position 330 (e.g., 330B after 330A). As the rack 102 moves to the next image position 330 or when the rack 102 is at or adjacent the next image position 330, the operation 304 and the subsequent operations are performed as described above. In some embodiments, when the operation 304 and the subsequent operations are performed, the rack barcode reading (such as illustrated in the operation 308) may be omitted if it has already been done once.

Figure 24:
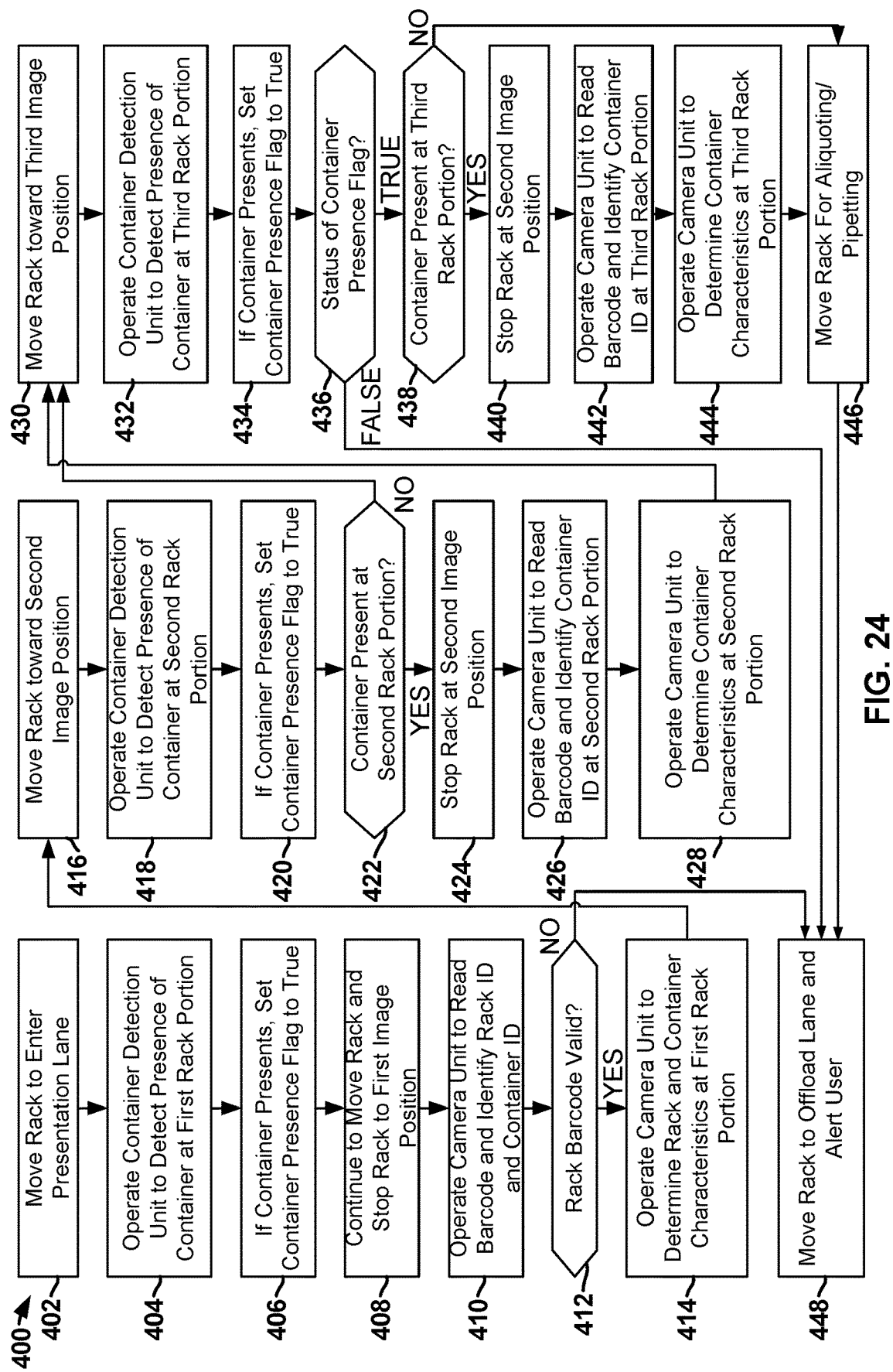
FIG. 24 is a flowchart of another example method for performing sample container recognition with respect to a rack.

FIG. 24 is a flowchart of another example method 400 for performing sample container recognition with respect to a rack 102. In some embodiments, the method 400 can be at least partially performed by the SPU 104, the sample container recognition unit 110, and/or other devices in the sample analyzer 100.

The method 400 can begin at operation 402 in which the rack 102 is moved to enter the presentation lane 128. In some embodiments, the carrier 132 operates to advance the rack 102 to the presentation lane 128, such as a movement from a position illustrated in FIG. 3 to a position illustrated in FIG. 4.

As illustrated, the rack 102 is oriented to move toward the sample container recognition unit 110 along the presentation lane 128 such that a first rack portion 332A (including first and second container positions 334A and 334B in this example) of the rack 102 first approaches toward the sample container recognition unit 110.

At operation 404, the sample container recognition unit 110 operates the container detection unit 204 to detect presence of any container 180 in the first rack portion 332A of the rack 102. The operation 404 is performed similarly to the operation 304 in FIG. 19. In the illustrated example, the first rack portion 332A of the rack 102 includes a first container position 334A and a second container position 334B, and therefore, the container detection unit 204 operates to detect whether either of the first container position 334A and the second container position 334B is occupied by a container 180, or whether both of the first container position 334A and the second container position 334B are occupied by containers 180, respectively.

As such, the container detection unit 204 performs the first fly-by check on the presence of containers in the first rack portion 332A of the rack 102 as the rack 102 is introduced into the presentation lane 128 and moving toward a first image position 330A, such as illustrated in FIG. 17.

The container detection unit 204 can include one or more sensors of various types. In some examples, the container detection unit 204 includes a photosensor of various types. For example, the container detection unit 204 includes a reflector-type photosensor (also referred to as a reflective photointerrupter or a photoreflector), which positions a light emitting element and a light receiving element on the same surface (so that they face the same direction) and is configured to detect presence and position of an object based on the reflected light from a target object. One example of such a reflector-type photosensor is GP2A25J0000F Series, which is available from Sharp Corporation (Osaka, Japan). Other types of photosensors can also be used for the container detection unit 204.

At operation 406, if any container 180 is detected in the first rack portion 332A of the rack 102, the sample container recognition unit 110 operates to store information representing that the rack includes at least one container therein. For example, the sample container recognition unit 110 operates to set a container presence flag ("At Least One Container Present Flag") to true if the rack 102 (e.g., the first rack portion 332A thereof) is determined to include one or two containers 180 at the operation 404.

At operation 408, the rack 102 continues to move to the first image position 330A and stops at the first image position 330A. For example, the carrier 132 operates to continuously move the rack 102 to the first image position 330A and stops the rack 102 thereat.

As described herein, the first image position 330A can be a position of the rack 102 relative to the camera unit 202 where the container(s) 180 secured at the first container portion 332A, which include the first and second container positions 334A and 334B, can be at least partially captured by the camera unit 202, as illustrated in FIGS. 21A and 23A. In the illustrated example, the rack barcode 188 provided to the rack 102 is also viewed in the first image position 330A.

Figure 23B:
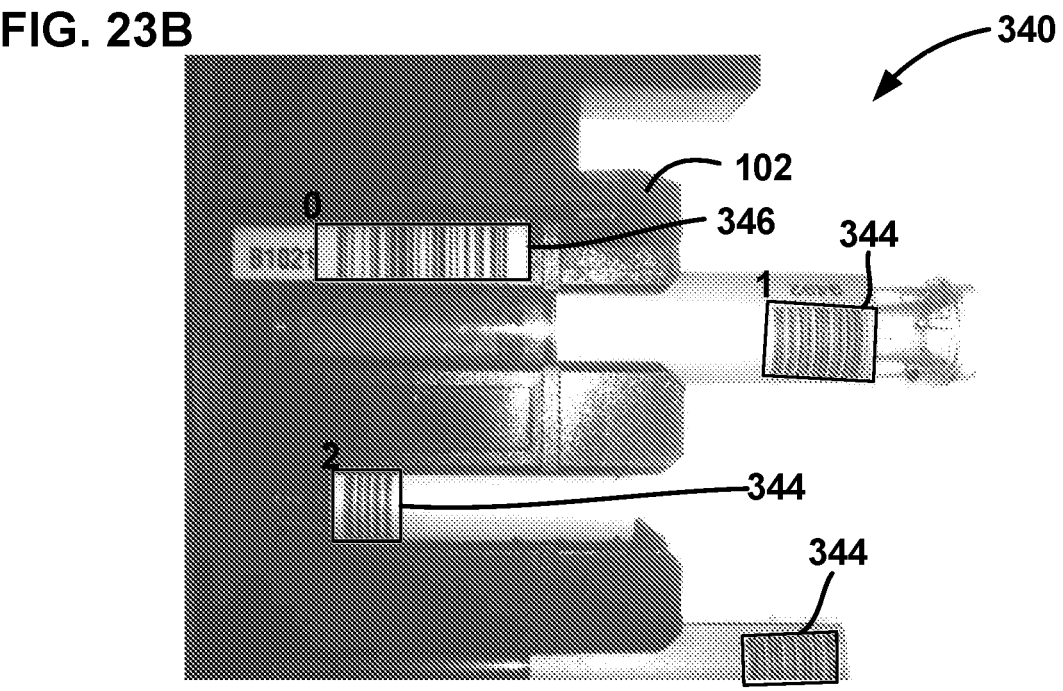
FIG. 23B is the monochromatic image of FIG. 23A with bar codes of corresponding sample tubes identified.

At operation 410, the sample container recognition unit 110 operates the camera unit 202 to read a container barcode 186 of each container 180 received in the first rack portion 332A of the rack 102 (which includes the first container position 334A and/or the second container position 334B). The operation 410 is similar to the operation 308 in FIG. 19. In some embodiment, the camera unit 202 operates to capture an image (such as the first image 350 in FIG. 21A) of the first rack portion 332A of the rack 102, and the image is processed to detect and read the container barcodes 186 of the containers 180 at the first and second container positions 334A and 334B (as illustrated in FIGS. 23A and 23B).

Once the container barcodes 186 are read, the sample container recognition unit 110 can identify the containers 180 based on the detected container barcodes 186. The sample container recognition unit 110 can store the identification information of the containers 180 (e.g., container ID(s)).

In some embodiments, the sample container recognition unit 110 operates to compare the detected container barcodes 186 with information provided by the user (e.g., a user input of information about the containers, which can be received through an input device of the sample analyzer 100), and determine if the container barcodes 186 matches the user input. The sample container recognition unit 110 can operate to store information representing that a particular container position 334 (e.g., 334A and/or 334B) includes a container 180 that does not match the user input. For example, the sample container recognition unit 110 can operate to flag the container position 334 of the rack 102 (e.g., the first container position 334A and/or the second container position 334B) that holds the container with the unmatched container barcode 186.

In addition, the sample container recognition unit 110 further operates the camera unit 202 to read the rack barcode 188 of the rack 102. In the illustrated example, the rack barcode 188 is provided adjacent to the first rack portion 332A of the rack 102 (near the first end 164 of the rack 102). Therefore, the image (such as the first image 350 in FIG. 21A) of the first rack portion 332A of the rack 102 includes the rack barcode 188 of the rack 102. The sample container recognition unit 110 processes the image to detect and read the rack barcode 188 of the rack 102.

Once the rack barcode 188 is read, the sample container recognition unit 110 can identify the rack 102 based on the detected rack barcode 188. The sample container recognition unit 110 can store the identification information of the rack 102 (e.g., rack ID).

Various image processing methods can be used to identify and read the barcodes 186 and 188. One example of such image processing methods is Cognex In-Sight Vision Software, available from Cognex Corporation (Natick, Mass.), which provides various tools, such as edge detection ("Edge"), pattern matching ("Pattern Match"), histogram analysis ("Histogram"), and barcode detection ("ReadID-Max").

At operation 412, the sample container recognition unit 110 can operate to determine whether the rack barcode 188 as detected is valid. If the rack barcode 188 is determined to be valid ("YES" at this operation), the method 400 proceeds to operation 414. Otherwise ("NO" at this operation), the method 400 skips to operation 448 in which the rack 102 is moved to the offload lane 126. At the operation 448, the sample analyzer 100 can operate to alert the user to the invalidity of the rack as determined at the operation 412. The alert can be of various types, such as a visual and/or audible alarm or notification through the sample analyzer 100.

At operation 414, the sample container recognition unit 110 can operate the camera unit 202 to determine characteristics of the container(s) 180 at the first rack portion 332A of the rack 102. The operation 414 is performed similarly to the operation 310 in FIG. 19.

For example, the sample container recognition unit 110 operates to process the image (such as the first image 350 in FIG. 21A) of the first rack portion 332A of the rack 102, and determine various characteristics associated with the containers 180, such as the dimension (e.g., height and width) of each container and the presence of a cap on the container. Such characteristics can be used to identify the type of the container, as described in more detail below. An example detailed method for performing the operation 414 is described and illustrated with reference to FIG. 25.

In addition, the sample container recognition unit 110 can operate the camera unit 202 to determine characteristics of the rack 102, similarly to the determination of the container characteristics. In some embodiments, the image (such as the first image 350 in FIG. 21A) of the first rack portion 332A of the rack 102 can be processed to determine the rack characteristics. In other embodiments, the rack barcode 188 identified from the captured image can be used to determine the rack characteristics.

In some embodiments, the data of the container characteristics and/or the rack characteristics obtained above can be stored in the sample container recognition unit 110. In some embodiments, if the container(s) have predetermined undesirable characteristics (e.g., uncapped, unapproved, and/or inappropriate container positions), the sample container recognition unit 110 can store information representing that a particular container position 334 (e.g., 334A and/or 334B) includes a container 180 that does not match the user input. For example, the sample container recognition unit 110 can operate to flag the container position 334 of the rack 102 (e.g., the first container position 334A and/or the second container position 334B) that holds the container with such undesirable characteristics.

At operation 416, the rack 102 is operated to move toward the second image position 330B. As described herein, the second image position 330B can be a position of the rack 102 relative to the camera unit 202 where the container(s) 180 secured at the second container portion 332B, which include the third and fourth container positions 334C and 334D, can be at least partially captured by the camera unit 202, as illustrated in FIG. 21B.

At operation 418, the sample container recognition unit 110 operates the container detection unit 204 to detect presence of any container 180 in the second rack portion 332B of the rack 102. The operation 418 is performed similarly to the operation 304 in FIG. 19, or the operation 404 above. In the illustrated example, the second rack portion 332B of the rack 102 includes the third container position 334C and the fourth container position 334D, and therefore, the container detection unit 204 operates to detect whether either of the third container position 334C and the fourth container position 334D is occupied by a container 180, or whether both of the third container position 334C and the fourth container position 334D are occupied by containers 180, respectively.

As such, the container detection unit 204 performs the second fly-by check on the presence of containers in the second rack portion 332B of the rack 102 as the rack 102 is moving toward the second image position 330B.

At operation 420, if any container 180 is detected in the second rack portion 332B of the rack 102, the sample container recognition unit 110 operates to store information representing that the rack includes at least one container therein. For example, the sample container recognition unit 110 operates to set the container presence flag ("At Least One Container Present Flag") to true if the rack 102 (e.g., the second rack portion 332B thereof) is determined to include one or two containers 180 at the operation 418.

At operation 422, it is determined whether any container is present at the second rack portion 332B of the rack 102 (e.g., either or both of the third container position 334C and the fourth container position 334D). If the presence of any container is determined at the second rack portion 332B ("YES"), the method 400 continues to operation 424. Otherwise ("NO"), the method 400 skips to operation 448.

At operation 424, the rack 102 is stopped and made stationary at the second image position 330B.

At operation 426, the sample container recognition unit 110 operates the camera unit 202 to read a container barcode 186 of each container 180 received in the second rack portion 332B of the rack 102 (which includes the third container position 334A and/or the fourth container position 334D). The operation 418 is similar to the operation 308 in FIG. 19, or the operation 410 above. In some embodiment, the camera unit 202 operates to capture an image (such as the second image 352 in FIG. 21B) of the second rack portion 332B of the rack 102, and the image is processed to detect and read the container barcodes 186 of the containers 180 at the third and fourth container positions 334C and 334D.

Once the container barcodes 186 are read, the sample container recognition unit 110 can identify the containers 180 based on the detected container barcodes 186. The sample container recognition unit 110 can store the identification information of the containers 180 (e.g., container ID(s)).

In some embodiments, the sample container recognition unit 110 operates to compare the detected container barcodes 186 with information provided by the user (e.g., a user input of information about the containers, which can be received through an input device of the sample analyzer 100), and determine if the container barcodes 186 matches the user input. The sample container recognition unit 110 can operate to store information representing that a particular container position 334 (e.g., 334C and/or 334D) includes a container 180 that does not match the user input. For example, the sample container recognition unit 110 can operate to flag the container position 334 of the rack 102 (e.g., the first container position 334C and/or the second container position 334D) that holds the container with the unmatched container barcode 186.

In some embodiments, the sample container recognition unit 110 further operates to cross check if the containers 180 identified at the second image position 330B match (or be compatible with) the identification of the rack 102 (e.g., the rack ID found at the operation 410).

At operation 428, the sample container recognition unit 110 can operate the camera unit 202 to determine characteristics of the container(s) 180 at the second rack portion 332B of the rack 102. The operation 414 is performed similarly to the operation 310 in FIG. 19 or the operation 414 above.

For example, the sample container recognition unit 110 operates to process the image (such as the second image 352 in FIG. 21B) of the second rack portion 332B of the rack 102, and determine various characteristics associated with the containers 180, such as the dimension (e.g., height and width) of each container and the presence of a cap on the container. Such characteristics can be used to identify the type of the container, as described in more detail below. An example detailed method for performing the operation 428 is described and illustrated with reference to FIG. 25.

In some embodiments, the data of the container characteristics obtained above can be stored in the sample container recognition unit 110. In some embodiments, if the container(s) have predetermined undesirable characteristics (e.g., uncapped, unapproved, and/or inappropriate container positions), the sample container recognition unit 110 can store information representing that a particular container position 334 (e.g., 334C and/or 334D) includes a container 180 that does not match the user input. For example, the sample container recognition unit 110 can operate to flag the container position 334 of the rack 102 (e.g., the third container position 334C and/or the fourth container position 334D) that holds the container with such undesirable characteristics.

At operation 430, the rack 102 is operated to move toward the third image position 330C. As described herein, the third image position 330C can be a position of the rack 102 relative to the camera unit 202 where the container(s) 180 secured at the third container portion 332C, which include the fifth, sixth, and seventh container positions 334E, 334F, and 334G, can be at least partially captured by the camera unit 202, as illustrated in FIG. 21C.

At operation 432, the sample container recognition unit 110 operates the container detection unit 204 to detect presence of any container 180 in the third rack portion 332C of the rack 102. The operation 432 is performed similarly to the operation 304 in FIG. 19, or the operation 404 or 418 above. In the illustrated example, the third rack portion 332C of the rack 102 includes the fifth container position 334E, the sixth container position 334F, and the seventh container position 334G, and therefore, the container detection unit 204 operates to detect whether any or all of the fifth container position 334E, the sixth container position 334F, and the seventh container position 334G are occupied by a container or containers 180.

As such, the container detection unit 204 performs the third fly-by check on the presence of containers in the third rack portion 332C of the rack 102 as the rack 102 is moving toward the third image position 330C.

At operation 434, if any container 180 is detected in the third rack portion 332C of the rack 102, the sample container recognition unit 110 operates to store information representing that the rack includes at least one container therein. For example, the sample container recognition unit 110 operates to set the container presence flag ("At Least One Container Present Flag") to true if the rack 102 (e.g., the third rack portion 332B thereof) is determined to include one or two containers 180 at the operation 432.

At operation 436, the sample container recognition unit 110 operates to determine the status (either true or false) of the container presence flag ("At Least One Container Present Flag"). If the status is true ("True), the method 400 goes on to operation 438. Otherwise ("False"), the method 400 skips to operation 448.

At operation 438, it is determined whether any container is present at the third rack portion 332C of the rack 102 (e.g., any or all of the fifth container position 334E, the sixth container position 334F, and the seventh container position 334G). If the presence of any container is determined at the third rack portion 332C ("YES"), the method 400 continues to operation 440. Otherwise ("NO"), the method 400 skips to operation 446.

At operation 440, the rack 102 is stopped and made stationary at the third image position 330C.

At operation 442, the sample container recognition unit 110 operates the camera unit 202 to read a container barcode 186 of each container 180 received in the third rack portion 332C of the rack 102 (which includes the fifth container position 334E, the sixth container position 334F, and the seventh container position 334G). The operation 418 is similar to the operation 308 in FIG. 19, or the operation 410 or 426 above. In some embodiment, the camera unit 202 operates to capture an image (such as the third image 354 in FIG. 21C) of the third rack portion 332C of the rack 102, and the image is processed to detect and read the container barcodes 186 of the containers 180 at the fifth container position 334E, the sixth container position 334F, and the seventh container position 334G.

Once the container barcodes 186 are read, the sample container recognition unit 110 can identify the containers 180 based on the detected container barcodes 186. The sample container recognition unit 110 can store the identification information of the containers 180 (e.g., container ID(s)).

In some embodiments, the sample container recognition unit 110 operates to compare the detected container barcodes 186 with information provided by the user (e.g., a user input of information about the containers, which can be received through an input device of the sample analyzer 100), and determine if the container barcodes 186 matches the user input. The sample container recognition unit 110 can operate to store information representing that a particular container position 334 (e.g., 334E, 334F, and/or 334G) includes a container 180 that does not match the user input. For example, the sample container recognition unit 110 can operate to flag the container position 334 of the rack 102 (e.g., the fifth container position 334E, the sixth container position 334F, and/or the seventh container position 334G) that holds the container with the unmatched container barcode 186.

In some embodiments, the sample container recognition unit 110 further operates to cross check if the containers 180 identified at the third image position 330C match (or be compatible with) the identification of the rack 102 (e.g., the rack ID found at the operation 410).

At operation 444, the sample container recognition unit 110 can operate the camera unit 202 to determine characteristics of the container(s) 180 at the third rack portion 332C of the rack 102. The operation 414 is performed similarly to the operation 310 in FIG. 19 or the operation 414 or 428 above.

For example, the sample container recognition unit 110 operates to process the image (such as the third image 354 in FIG. 21C) of the third rack portion 332C of the rack 102, and determine various characteristics associated with the containers 180, such as the dimension (e.g., height and width) of each container and the presence of a cap on the container. Such characteristics can be used to identify the type of the container, as described in more detail below. An example detailed method for performing the operation 444 is described and illustrated with reference to FIG. 25.

In some embodiments, the data of the container characteristics obtained above can be stored in the sample container recognition unit 110. In some embodiments, if the container(s) have predetermined undesirable characteristics (e.g., uncapped, unapproved, and/or inappropriate container positions), the sample container recognition unit 110 can store information representing that a particular container position 334 (e.g., 334E, 334F, and/or 334G) includes a container 180 that does not match the user input. For example, the sample container recognition unit 110 can operate to flag the container position 334 of the rack 102 (e.g., the fifth container position 334E, the sixth container position 334F, and/or the seventh container position 334G) that holds the container with such undesirable characteristics.

At operation 446, the rack 102 is moved to an aliquoting and/or pipetting system for sample processing.

In some embodiments, the information outputted to the aliquoting and/or pipetting system from the SPU with the sample container recognition unit 110 includes information about the barcodes, which can be used to prioritize sample aspiration and indicate types of sample (e.g., low volume, STAT, and calibration samples). The information from the SPU with the sample container recognition unit 110 can further include vision information, such as types of containers, which can be determined from a library of container types. The information that can be provided to the sample pipettor may include a starting position to start level sensing to detect liquid (top of container), a maximum allowable depth of travel during aspiration (liquid dead volume or bottom of container), and an internal geometry of sample container (useful for accurate aspiration in cause any further offsets required of the SPU and the pipettor).

At operation 448, once the sample processing is performed at the operation 446, the rack 102 is moved to the offload lane 126. Further, the sample analyzer 100 can operate to alert the user to various pieces of information, such as the invalidity of the rack as determined at the operation 412, the status (i.e., false) of the container presence flag as determined at the operation 436, or the end of the sample processing as performed at the operation 446. The alert can be of various types, such as a visual and/or audible alarm or notification through the sample analyzer 100.

As described above, if no container is found at a particular image position 330, the rack 102 can bypass that particular image position. For example, the rack 102 can skip to a next image position 330 without performing container recognition operations at the particular image position. As such, the bypass algorithm around the vision checks can save time. The main instrument has a cycle time (e.g., 8 seconds), and the SPU operation is partially independent of the main instrument, but ideally finishes within 8 seconds. For example, if a number improper racks are present, then bypassing allows them to be cleared quickly. Therefore, thanks to the bypassing, the main instrument does not need to wait for the SPU to complete its operation.

Figure 25:
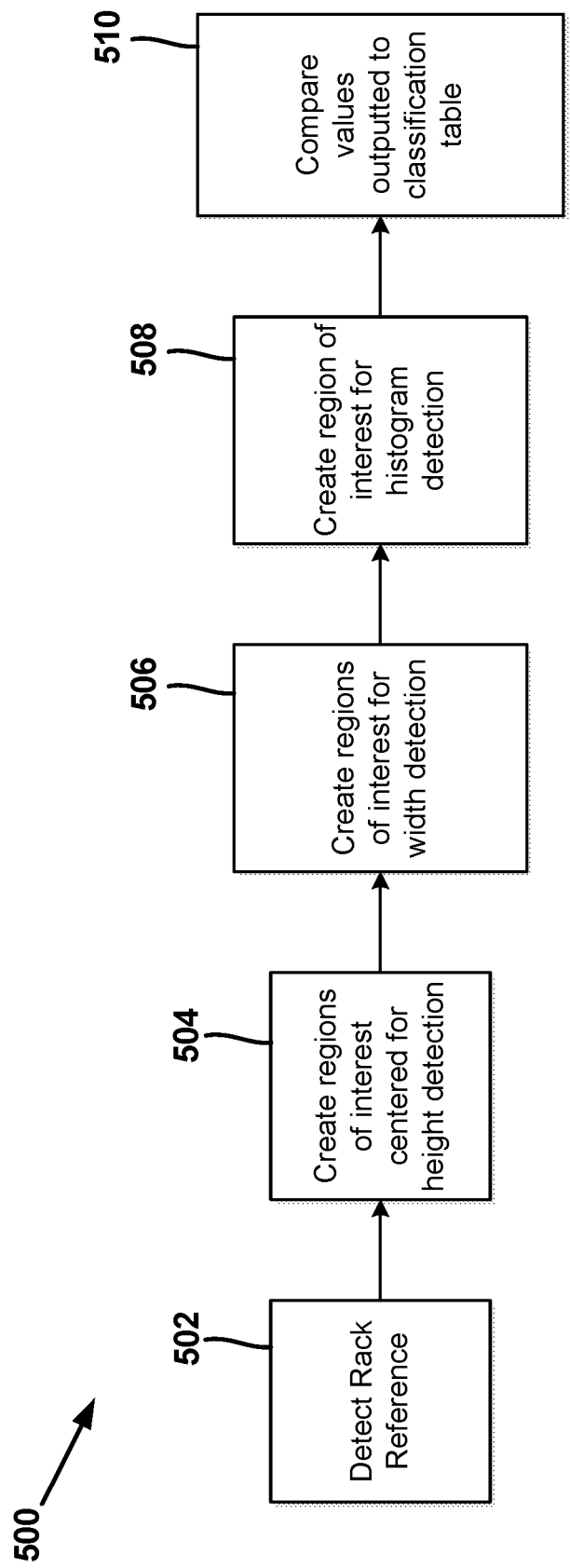
FIG. 25 is a flowchart of an example method for processing an image of a rack with one or more containers and determining characteristics of the containers therein.

FIG. 25 is a flowchart of an example method 500 for processing an image of a rack with one or more containers and determining characteristics of the containers therein. In some embodiments, the method 500 is used to perform the operations 414, 428, and 444 as described in FIG. 24. In some embodiments, the method 500 can be at least partially performed by the SPU 104, the sample container recognition unit 110, and/or other devices in the sample analyzer 100. The method 300 is described with reference also with FIGS. 26-32.

The method 500 can begin at operation 502 in which a rack reference 520 is identified in a captured image. In some embodiments, the first hook 160 (also referred to herein as a front tab) of the rack 102 is used as the rack reference 520. The first hook 160 can be detected in an image (e.g., the first image 350) captured when the rack 102 is at a first stopping position (e.g., the first image position 330A).

Figure 26:
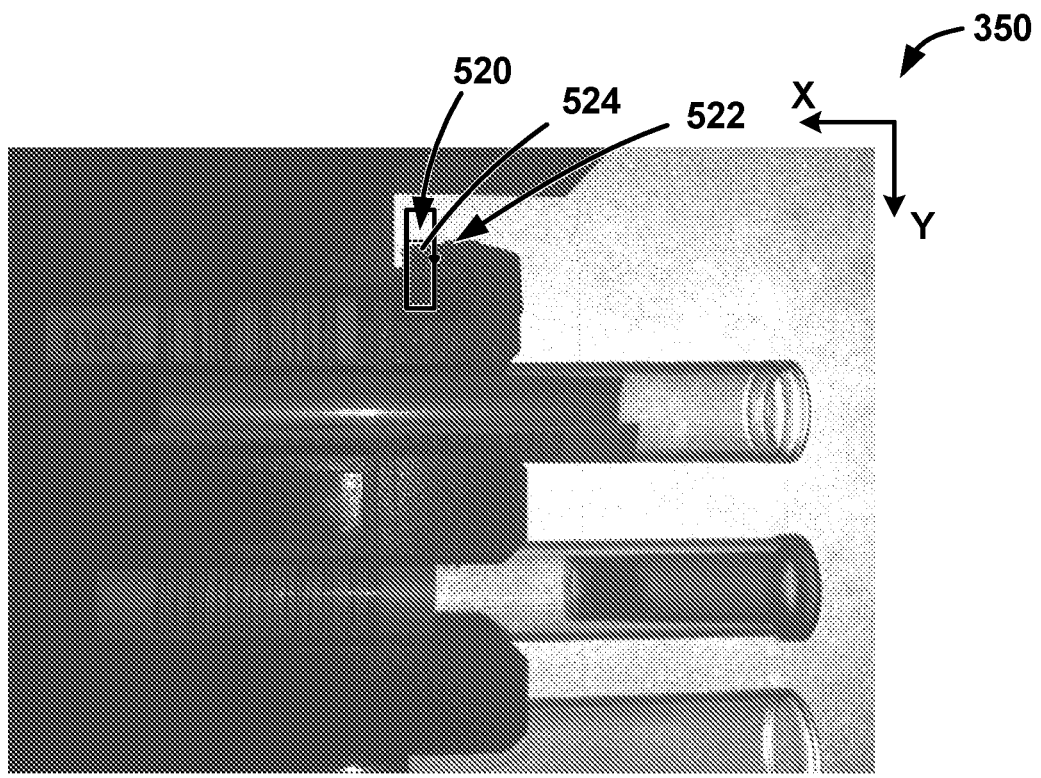
FIG. 26 is the image of FIG. 21A with rack features identified.

For example, an edge 522 of the rack 102 (FIG. 5) is predetermined as the rack reference 520. The predetermined edge 522 of the rack 102 can be recognized in the first image 350 by the sample container recognition unit 110, as illustrated in FIG. 26. In this illustration, the identified edge 522 of the rack 102 is indicated as a line 524, which is an icon representative of the recognition by the camera unit 202 of the edge 522. In this embodiment, the X-axis assumes that the rack 102 is fully engaged.

At operation 504, the sample container recognition unit 110 operates to create one or more regions of interest 528 (also referred to herein as height regions of interest) for container height detection. In some embodiments, three regions of interest 528 (including 528A, 528B, and 528C) are created relative to the rack reference 520, such as by offsetting from the rack reference 520 in the Y-axis.

Figure 27:
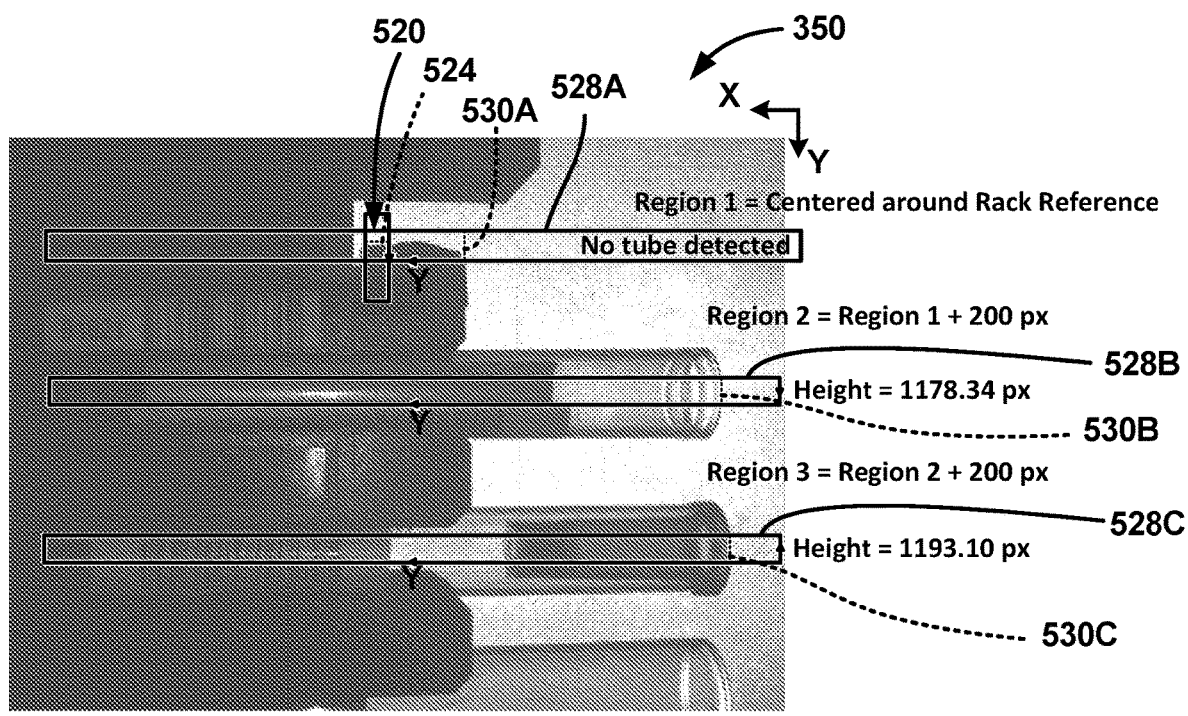
FIG. 27 is the image of FIG. 21A with container features identified.
Figure 28:
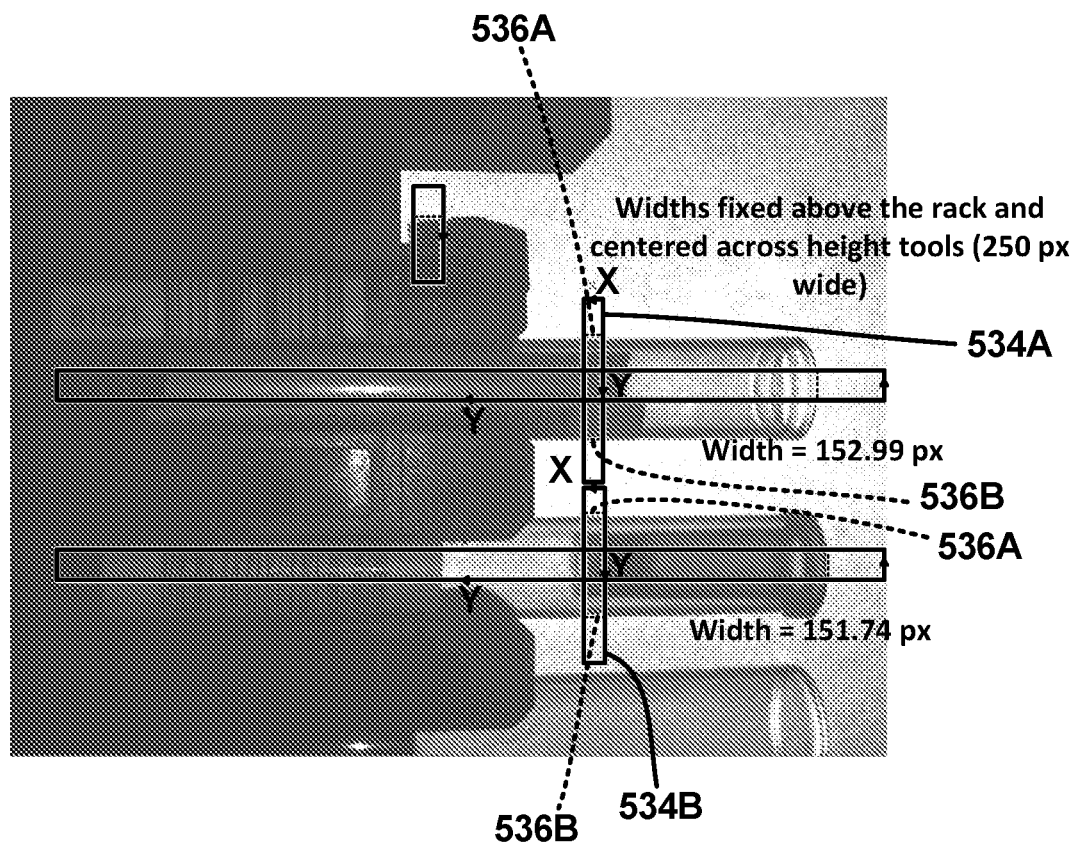
FIG. 28 is the image of FIG. 21A with container features identified.
Figure 29:
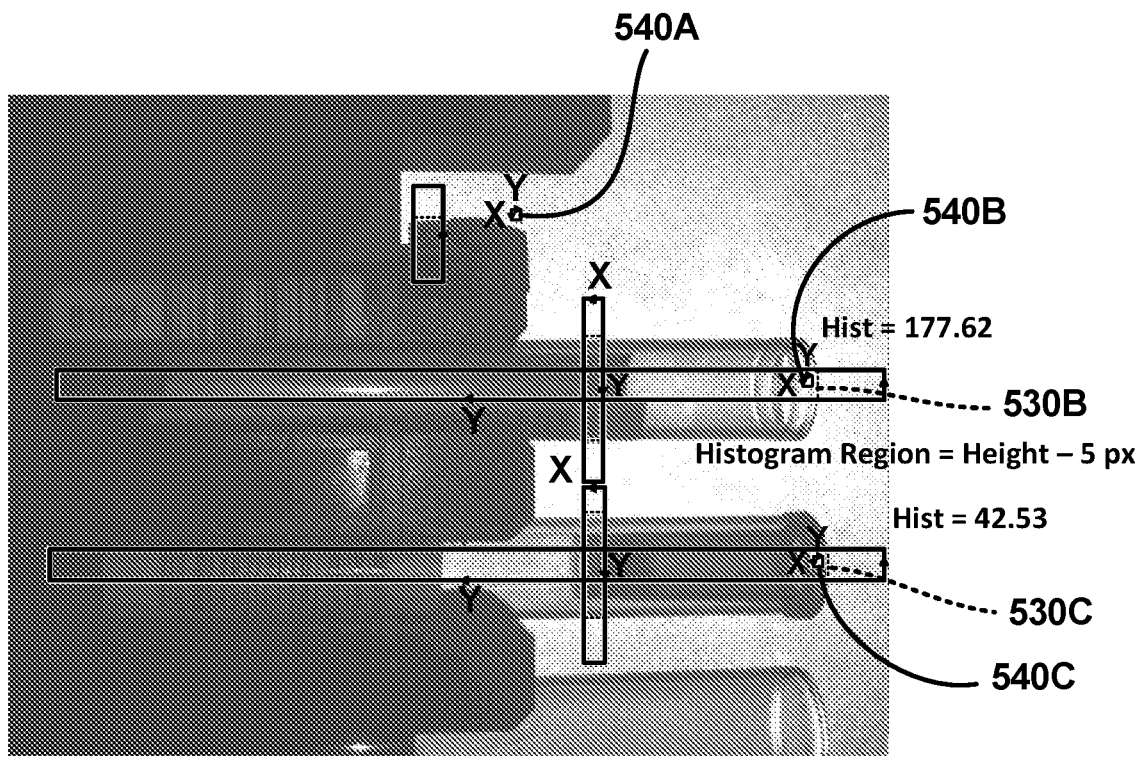
FIG. 29 is the image of FIG. 21A with histogram features identified.

In the illustrated example of FIG. 27, in the image 350, a first region of interest 528A is created and arranged to be centered on the rack reference 520 in the Y-axis. A second region of interest 528B is created and arranged to be offset from the first region of interest 528A at a predetermined distance (e.g., 200 pixels in FIG. 27) in the Y-axis. A third region of interest 528C is created and arranged to be offset from the second region of interest 528B at a predetermined distance (e.g., 200 pixels in FIG. 27) in the Y-axis. Alternatively, the third region of interest 528C can be created by offsetting from the first region of interest 528A.

For each of the regions of interest 528, the sample container recognition unit 110 operates to detect a top tube edge 530 (e.g., 530A, 530B, and 530C) and determine the height of the associated container 180. In the illustrated example of FIG. 27, the height of the container 180 associated with the second region of interest 528B is measured to be 1178.34 pixels, and the height of the container 180 associated with the third region of interest 528C is measured to be 1193.10 pixels.

In some embodiments, a result indicating that no container has been detected can be generated, instead of reporting the height of the container. For example, there is no container in the first region of interest 528A, and thus, the no-container-detection result will be outputted. In other embodiments, the sample container recognition unit 110 operates to determine the X-coordinate measurement of the rack using the top tube edge 530A in the first region of interest 528A.

At operation 506, the sample container recognition unit 110 operates to create one or more regions of interest 534 (also referred to herein as width regions of interest) for container width (or diameter) detection. In some embodiments, the width regions of interest 534 are created at a preset distance above the rack 102 (in the X-axis) and centered across the height regions of interest 528, respectively. The width regions of interest 534 are arranged to transverse the height regions of interest 528, respectively. In some embodiments, the width (i.e., the Y-axis distance) of each width region of interest 534 can be preset, such as 250-pixel wide in FIG. 28.

For each of the width regions of interest 534, the sample container recognition unit 110 operates to detect two opposite sides 536A and 536B of the container and determine the width of the associated container 180. In the illustrated example of FIG. 28, the width of the container 180 associated with a region of interest 534A is measured to be 152.99 pixels (i.e., a pixel distance between the opposite sides 536A and 536B), and the width of the container 180 associated with a region of interest 534B is measured to be 151.74 pixels (i.e., a pixel distance between the opposite sides 536A and 536B).

At operation 508, the sample container recognition unit 110 operates to create one or more regions of interest 540 (also referred to herein as histogram regions of interest) for histogram analysis.

In some embodiments, three histogram regions of interest 540 (including 540A, 540B, and 540C) created relative to the top of each height region, such as by offsetting from the top tube edge 530 in the X-axis. In some embodiments, the histogram regions of interest 540 are created at a preset distance from the top tube edge 530 in the X-axis (e.g., 5 pixels from the top tube edge 530), while detection of the container has occurred. In some embodiments, the dimension of each histogram region of interest 540 can be predetermined.

Once the histogram regions of interest 540 are created, a histogram value is obtained for each of the histogram regions of interest 540. In the illustrated example of FIG. 29, the histogram value of a region of interest 540B associated with the second region of interest 528B is measured to be 177.62, and the histogram value of a region of interest 540C associated with the third region of interest 528C is measured to be 42.53.

Figure 30:
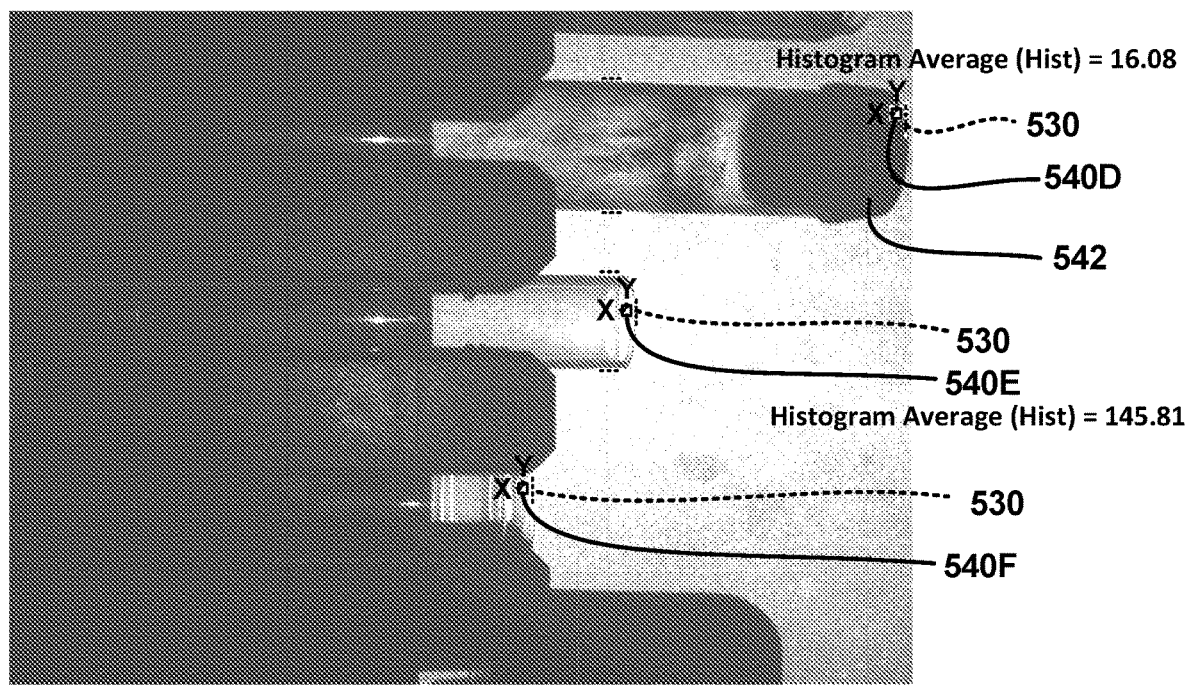
FIG. 30 is the image of FIG. 21C with histogram features identified.

In some embodiments, the histogram analysis at the operation 508 can also detect presence of a cap on the container. As illustrated in FIG. 30, the measurement of histogram regions of interest 540 can indicate whether a cap is present or not. In some embodiments, a low histogram value can indicate that a cap is present in that position, and a high histogram value can indicate no cap is present at that position. In the example of FIG. 30, the average histogram value of a region of interest 540D over a cap 542 of the container 180 is measured to be 16.08 (a relatively low value), and the average histogram value of regions of interest 540E and 540F over the containers 180 without a cap are measured to be 145.81.

At operation 510, the sample container recognition unit 110 operates to compare the information obtained at the operations above with a classification table 550 (FIG. 31). For example, for each container, the height value, the width value, and/or the histogram value, can be compared with values in the classification table 550, and a type of the container is determined based on the comparison.

As illustrated in FIG. 31, the classification table 550 is provided to classify different types of containers (the first column) based on the height, width, and histogram values. For each type of container, the height, width, and histogram values can be provided with a minimum value, a maximum value, and an average value.

By way of example, if the height value obtained in the method 500 is between H5 and H6, the width value obtained in the method 500 is between W5 and W6, and the histogram value obtained in the method 500 is between HS5 and HS6, the container at issue can be identified as 12×65 or 13×75 mm tube with a cap (the second row of the table 550).

Figure 32:
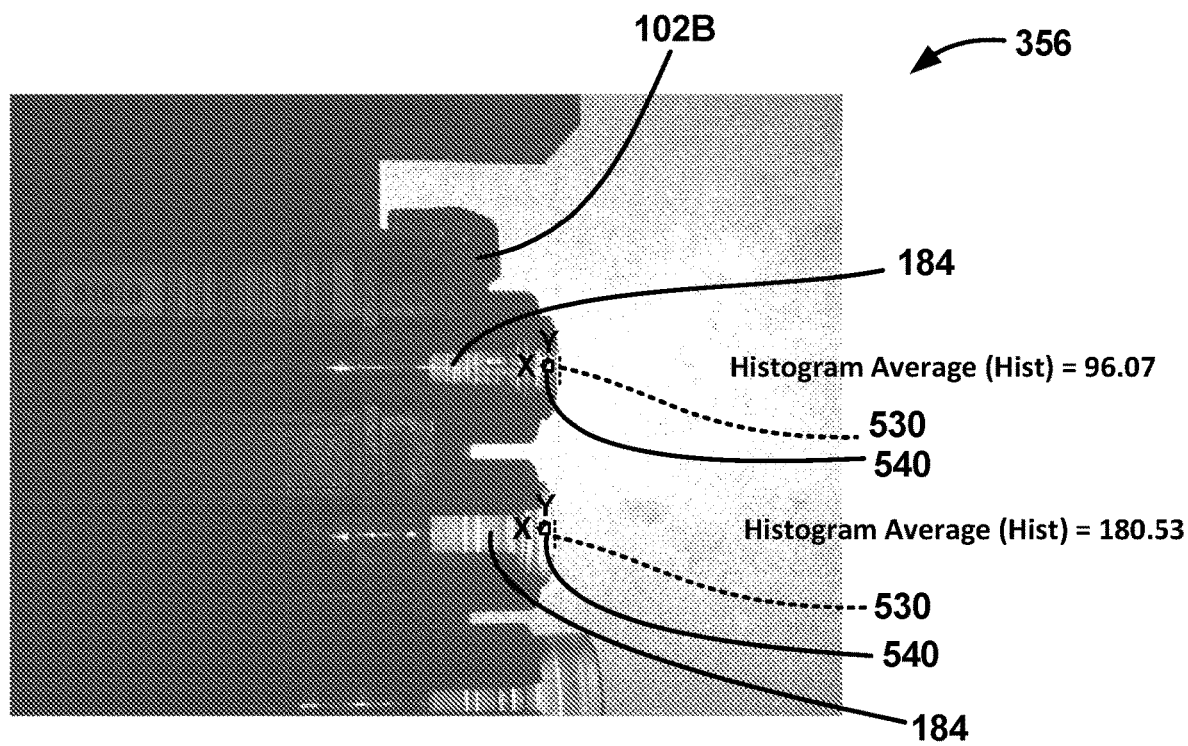
FIG. 32 is a monochromatic image of a portion of a cup rack with sample cups and showing histogram features identified.

As illustrated in FIG. 32, where the rack 102 is a cup rack 102B with sample cups 184, the same method 500 can be applied to identify the type of the sample cups 184. As described above, the measurement of histogram regions of interest 540 indicates which types of the cups are present. The histogram data may be combined with other measurements such as height and width (diameter) to determine the types of the cups in the cup rack 102B.

Figure 33:
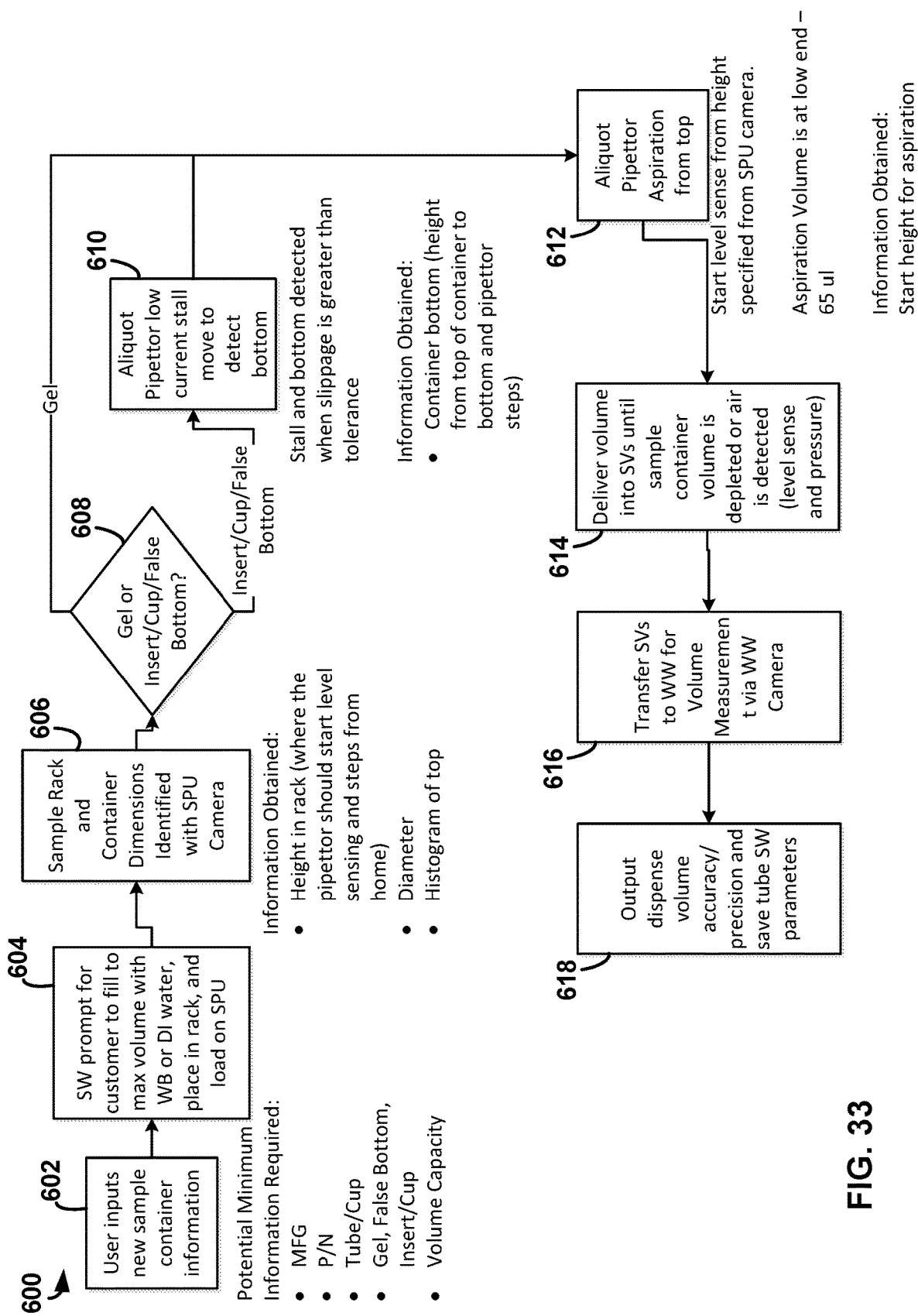
FIG. 33 is a flowchart of an example method for adding and verifying a new container type for use with the sample analyzer.

FIG. 33 is a flowchart of an example method 600 for adding and verifying a new container in the classification table 550 (i.e., container library, list of approved containers, etc.).

At step 602, the user enters information on a new sample container. This information may include type of container, internal geometry, volume, manufacturer part number, external dimensions, etc. At step 604, the user loads rack with container of interest to be added to the classification table 550 by software (i.e., SW). The user further fills up the container to maximum volume, and loads the rack 102 into the onload lane 124 of the SPU 104.

When the user inputs new sample container information (at operation 602), the sample analyzer 100 (e.g., a software application herein) operates to prompt for the user to provide the maximum volume with wash buffer or deionized water, places the new sample container in the rack 102, and loads it on the SPU 104 (at operation 604). At the operation 602, the information may include information about a manufacturer, a part number, a type of container (e.g., either a tube or a cup), plasma or serum gel matrix in tube) internal container geometry, insert/cup, (i.e., a cup sitting inside of a tube), and/or a volume capacity.

Then, at operation 606, the SPU (including the sample container recognition unit 110 therein) operates to identify the dimensions of the sample rack and containers therein. In some embodiments, the information obtained include a height in the rack (e.g., where the pipettor should start level sensing and steps from a home position), a diameter, and a histogram value at the top of each container.

At operation 608, it is determined whether the new sample container is a gel or insert/cup, etc. If operation 608 determines container to be an insert/cup/, etc. then the aliquot pipettor moves to detect the bottom of the container at operation 610. If operation 608 determines the container to be a gel tube, then the aliquot pipettor begins aliquotting from near the top of the liquid in the container.

At steps 608-618, the sample analyzer 100 (i.e., the instrument) processes the new container and observes the characteristics of the new container as measured by the various detection functions of the sample analyzer 100. For example, to measure volume at step 616, all the fluid from the container is transferred to a sample vessel (i.e., SV), and the sample vessel is transferred to the wash wheel (i.e., WW).

As described herein, the present disclosure can address the user's need of loading mixed types of sample containers into a single rack. Different types of racks (e.g., a tube rack and a cup rack) each can hold a plurality of sample container types. Each of different types of racks interfaces with the analyzer in the same way, thereby removing the hassle of sorting sample containers, and eliminating the user error of loading sample containers into wrong sample racks, which could cause QNS (Quantity Not Sufficient) errors.

The present disclosure also serves as general process monitoring on the sample presentation unit (SPU) to identify the type of container for accurate aspiration of sample, to detect user error of placing the capped sample containers in the sample rack, and also detect user errors associated with placing containers in wrong positions in the sample rack than assigned when ordering tests. There is a container library (e.g., a tube library and a cup library). The characteristics determined by the vision system are matched against the libraries to determine which vessel is in each occupied rack position.

Figure 34:
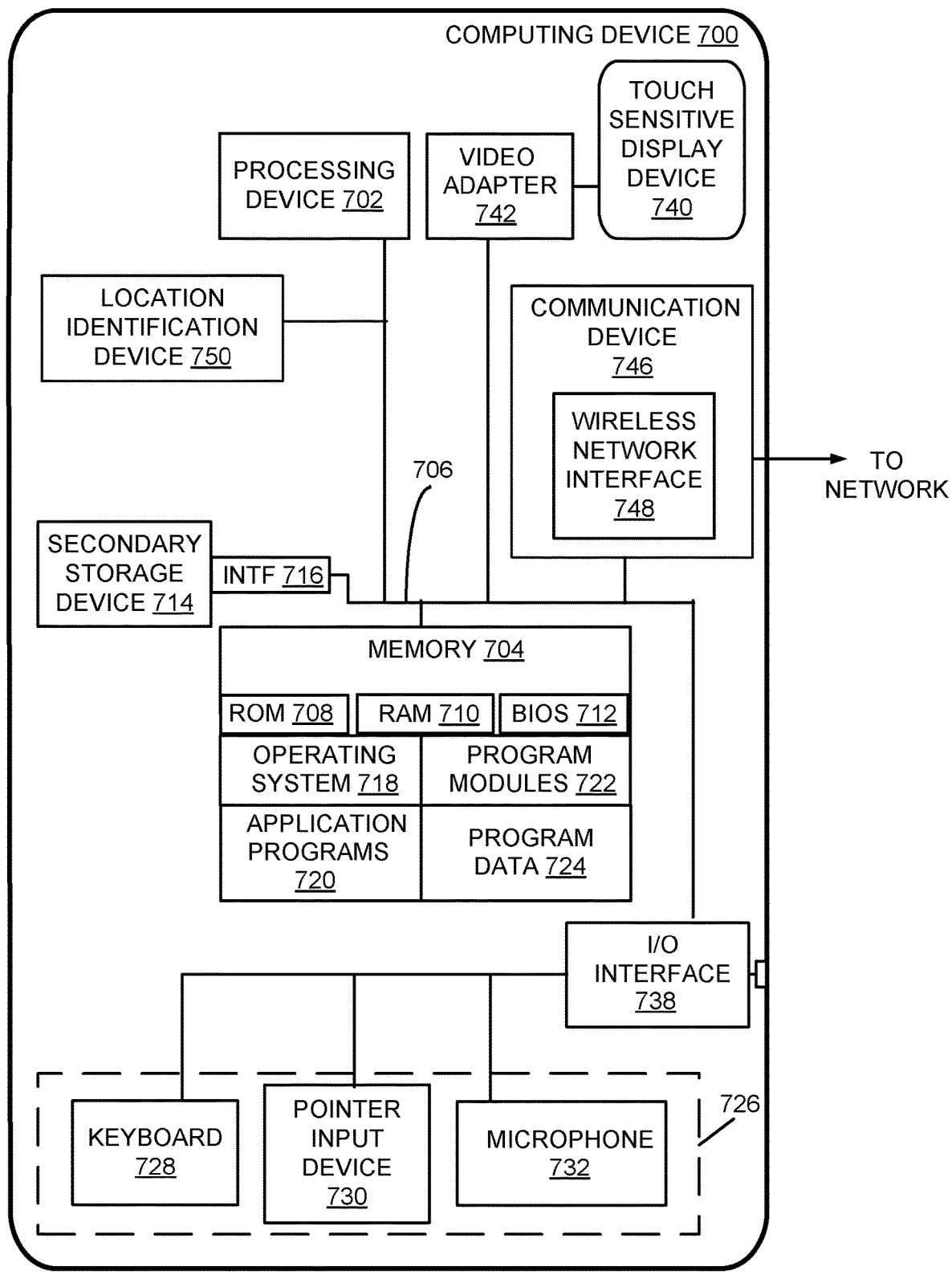
FIG. 34 illustrates an exemplary architecture of a computing device that can be used to implement aspects of the present disclosure.

FIG. 34 illustrates an exemplary architecture of a computing device that can be used to implement aspects of the present disclosure, including the sample analyzer 100 or various systems of the sample analyzer 100, such as the sample container recognition unit 110 and other subunits or subdevices. Further, one or more devices or units included in the systems of the sample analyzer 100 can also be implemented with at least some components of the computing device as illustrated in FIG. 34. Such a computing device is designated herein as reference numeral 700. The computing device 700 is used to execute the operating system, application programs, and software modules (including the software engines) described herein.

The computing device 700 includes, in some embodiments, at least one processing device 702, such as a central processing unit (CPU). A variety of processing devices are available from a variety of manufacturers, for example, Intel or Advanced Micro Devices. In this example, the computing device 700 also includes a system memory 704, and a system bus 706 that couples various system components including the system memory 704 to the processing device

702. The system bus 706 is one of any number of types of bus structures including a memory bus, or memory controller; a peripheral bus; and a local bus using any of a variety of bus architectures.

Examples of computing devices suitable for the computing device 700 include a desktop computer, a laptop computer, a tablet computer, a mobile device (such as a smart phone, an iPod® mobile digital device, or other mobile devices), or other devices configured to process digital instructions.

The system memory 704 includes read only memory 708 and random access memory 710. A basic input/output system 712 containing the basic routines that act to transfer information within computing device 700, such as during start up, is typically stored in the read only memory 708.

The computing device 700 also includes a secondary storage device 714 in some embodiments, such as a hard disk drive, for storing digital data. The secondary storage device 714 is connected to the system bus 706 by a secondary storage interface 716. The secondary storage devices and their associated computer readable media provide nonvolatile storage of computer readable instructions (including application programs and program modules), data structures, and other data for the computing device 700.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 714 or memory 704, including an operating system 718, one or more application programs 720, other program modules 722, and program data 724.

In some embodiments, computing device 700 includes input devices to enable a user to provide inputs to the computing device 700. Examples of input devices 726 include a keyboard 728, pointer input device 730, microphone 732, and touch sensitive display 740. Other embodiments include other input devices 726. The input devices are often connected to the processing device 702 through an input/output interface 738 that is coupled to the system bus 706. These input devices 726 can be connected by any number of input/output interfaces, such as a parallel port, serial port, game port, or a universal serial bus. Wireless communication between input devices and interface 738 is possible as well, and includes infrared, BLUETOOTH® wireless technology, WiFi technology (802.11a/b/g/n etc.), cellular, and/or other radio frequency communication systems in some possible embodiments.

In this example embodiment, a touch sensitive display device 740 is also connected to the system bus 706 via an interface, such as a video adapter 742. The touch sensitive display device 740 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 740, the computing device 700 can include various other peripheral devices (not shown), such as speakers or a printer.

The computing device 700 further includes a communication device 746 configured to establish communication across the network. In some embodiments, when used in a local area networking environment or a wide area networking environment (such as the Internet), the computing device 700 is typically connected to the network through a network interface, such as a wireless network interface 748. Other possible embodiments use other wired and/or wireless communication devices. For example, some embodiments of the computing device 700 include an Ethernet network interface, or a modem for communicating across the network. In yet other embodiments, the communication device 746 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 700 typically includes at least some form of computer-readable media. Computer readable media includes any available media that can be accessed by the computing device 700. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 700.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

In one aspect of the present disclosure, an automated clinical analyzer comprising: a sample rack presentation unit configured to present a sample rack to a sample pipettor, the sample rack having a plurality of sample container positions; an image capturing device coupled to the sample rack presentation unit, the image capturing device configured to capture at least one image on at least one region of interest on the sample rack, the at least one region of interest comprises at least one sample container; a computing device configured to identify a sample container type in a captured image by matching the captured image to reference images, the reference images comprising images of a plurality of different sample container types; and the computing device further configured to identify the sample container type in the captured image based on a matching threshold with the reference images, wherein if the captured image exceeds or is equal to the threshold of a reference image, then the sample container type is identified as the sample container type of the reference image, and wherein if the captured image does not meet the threshold of any reference image, then the sample container type is not identified.

In certain examples, if the sample container type is not identified, then the sample container is not processed by the sample pipettor.

In certain examples, if the sample container type is identified, then the computing device is further configured to determine a cap presence by analyzing a region of interest on the captured image, wherein the coordinates of the region of interest is based on the identified sample container type.

In certain examples, the computing device is configured to analyze the region of interest based on a matching threshold with the reference image of the identified sample container type.

In certain examples, the computing device is configured to analyze the region of interest based on edge detection.

In another aspect of the present disclosure, a method of determining a type of a container in a rack, the method comprising: capturing, using an image capturing device, at least one image of at least a portion of the container and at least a portion of the rack, the container being held by the rack; finding a reference feature on the rack as a first image feature in the at least one image; defining, at least in part, a first search area in the at least one image based on a first relative position to the first image feature in the at least one image; finding within the first search area in the at least one image a first feature on the container as a second image feature in the at least one image; calculating a first geometric characteristic of the container based on a location of the second image feature in the at least one image; and determining the type of the container by looking up the first geometric characteristic of the container in a table.

In certain examples, the reference feature is an edge of the rack.

In certain examples, the first image feature in the at least one image is offset and spaced from the first search area in the at least one image by the relative position.

In certain examples, the first relative position is predetermined.

In certain examples, the method may further comprise: defining, at least in part, a second search area in the at least one image based on a second relative position to the first image feature in the image; finding within the second search area in the at least one image a second feature on the container as a third image feature in the at least one image; finding within the second search area in the at least one image a third feature on the container as a fourth image feature in the at least one image; calculating a second geometric characteristic of the container based on a distance between the third image feature and the fourth image feature in the at least one image; and further determining the type of the container by looking up the second geometric characteristic of the container in the table.

In certain examples, the first geometric characteristic of the container is a longitudinal characteristic of the container.

In certain examples, the first geometric characteristic of the container indicates a length of the container.

In certain examples, the second geometric characteristic of the container indicates an outside diameter of the container.

In certain examples, the at least one image includes only a single image.

In certain examples, the at least one image includes a plurality of images taken at a plurality of rack positions.

In certain examples, the rack is holding a plurality of containers and wherein types of additional containers of the plurality of containers are determined by looking up geometric characteristics of the additional containers in the table.

In yet another aspect of the present disclosure, a method of determining a type and an identity of a container in a rack, the method comprising: capturing, using an image capturing device, at least one high exposure image of at least a portion of the container and at least a portion of the rack, the container being held by the rack; reading a code mark from the at least one high exposure image and thereby determining the identity of the container in the rack; capturing, using the image capturing device, at least one low exposure image of at least a portion of the container and at least a portion of the rack; finding a reference feature on the rack as an image feature in the at least one low exposure image and/or in the at least one high exposure image; defining, at least in part, a search area in the at least one low exposure image based on a relative position to the first image feature; finding within the first search area in the at least one low exposure image a feature on the container as a second image feature; calculating a geometric characteristic of the container based on a location of the second image feature; and determining the type of the container by looking up the geometric characteristic of the container in a table.

In certain examples, the code mark is a bar code.

In yet another aspect of the present disclosure, a method of determining if a cap is on a container in a rack, the method comprising: capturing, using an image capturing device, at least one image of at least a portion of the container and at least a portion of the rack, the container being held by the rack; finding a reference feature on the rack as a first image feature in the at least one image; defining, at least in part, a search area in the at least one image based on a first relative position to the first image feature in the at least one image; finding within the search area in the at least one image a feature on the container as a second image feature in the at least one image; defining a histogram area based on a second relative position of the second image feature in the at least one image; and extracting histogram information from the histogram area and thereby determining if the cap is on the container.

In certain examples, the histogram area is within the search area.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of determining a type of a container in a rack in an automated analyzer, the method comprising:
   capturing, using an image capturing device, at least one image of at least a portion of the container and at least a portion of the rack, the container being held by the rack;

finding a reference feature on the rack as a first image feature in the at least one image;

defining, at least in part, a first search area in the at least one image based on a first relative position to the first image feature in the at least one image;

finding within the first search area in the at least one image a first feature on the container as a second image feature in the at least one image;

calculating a first geometric characteristic of the container based on a location of the second image feature in the at least one image; and determining the type of the container by looking up the first geometric characteristic of the container in a table;

wherein the rack is holding a plurality of containers and wherein types of additional containers of the plurality of containers are determined by looking up geometric characteristics of the additional containers in the table.

2. The method of claim 1, wherein the reference feature is an edge of the rack.

3. The method of claim 1, wherein the first image feature in the at least one image is offset and spaced from the first search area in the at least one image by the first relative position.

4. The method of claim 1, wherein the first relative position is predetermined.

5. The method of claim 1, further comprising:

defining, at least in part, a second search area in the at least one image based on a second relative position to the first image feature in the image;

finding within the second search area in the at least one image a second feature on the container as a third image feature in the at least one image;

finding within the second search area in the at least one image a third feature on the container as a fourth image feature in the at least one image;

calculating a second geometric characteristic of the container based on a distance between the third image feature and the fourth image feature in the at least one image; and further determining the type of the container by looking up the second geometric characteristic of the container in the table.

6. The method of claim 5, further comprising determining if a cap is on the container in a rack, the method further comprising:

defining a histogram area based on the second relative position of the second image feature in the at least one image; and extracting histogram information from the histogram area and thereby determining if the cap is on the container.

7. The method of claim 6, wherein the histogram area is within the search area.

8. The method of claim 1, wherein the first geometric characteristic of the container is a longitudinal characteristic of the container.

9. The method of claim 1, wherein the first geometric characteristic of the container indicates a length of the container.

10. The method of claim 1, wherein the second geometric characteristic of the container indicates an outside diameter of the container.

11. The method of claim 1, wherein the at least one image includes only a single image.

12. The method of claim 1, wherein the at least one image includes a plurality of images taken at a plurality of rack positions.

13. The method of claim 1, further comprising:

determining an identity of the container in the rack by:

capturing, using the image capturing device, at least one high exposure image of at least a portion of the container and at least a portion of the rack;

reading a code mark from the at least one high exposure image and thereby determining the identity of the container in the rack; and wherein the at least one image is at least one low exposure image of at least the portion of the container and at least the portion of the rack.

14. The method of claim 13, wherein the code mark is a bar code.

15. The method of claim 1, further comprising adding and verifying a new type of container to the table, the method further comprising:

entering information on the new type of container;

loading the rack with the new type of container;

loading the rack with the new type of container into an onload lane of the automated analyzer; and observing characteristics of the new type of container with the image capturing device.

* * * * *